(12) United States Patent
Yuba et al.

(10) Patent No.: US 7,875,339 B2
(45) Date of Patent: Jan. 25, 2011

(54) THERMOPLASTIC RESIN CASING AND METHOD FOR FABRICATING THE SAME

(75) Inventors: Takashi Yuba, Shinagawa (JP); Shinichiro Akieda, Shinagawa (JP); Takashi Arita, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 491 days.

(21) Appl. No.: 11/812,366

(22) Filed: Jun. 18, 2007

(65) Prior Publication Data

US 2008/0145578 A1 Jun. 19, 2008

(30) Foreign Application Priority Data

Dec. 19, 2006 (JP) .............................. 2006-341784

(51) Int. Cl.
*B32B 3/04* (2006.01)
*B32B 23/02* (2006.01)
*B32B 1/00* (2006.01)

(52) U.S. Cl. ..................... 428/174; 428/31; 428/121; 428/192

(58) Field of Classification Search ................ 428/174, 428/192, 31, 121, 122–126; 296/146.7; 430/1; 359/14

See application file for complete search history.

(56) References Cited

U.S. PATENT DOCUMENTS 5,922,431 A * 7/1999 Funato et al. .................. 428/71
6,746,126 B2 * 6/2004 Scherber et al. ............. 359/613

FOREIGN PATENT DOCUMENTS

| JP | 08-156016 | | 6/1996 |
| JP | 08-300399 | | 11/1996 |
| JP | 2004-106598 | | 4/2004 |
| JP | 2004106598 A | * | 4/2004 |
| JP | 2005-119404 | | 5/2005 |
| JP | 2006-168267 | | 6/2006 |

* cited by examiner

Primary Examiner—David R Sample
Assistant Examiner—Catherine Simone
(74) Attorney, Agent, or Firm—Staas & Halsey LLP

(57) ABSTRACT

The present invention relates to a decoration technique for providing iridescent color effects or glittering luster effects to a resin casing by attaching a polarizing film in contact with a resin casing, and for finishing a cut-off edge portion of the polarizing film smooth. After forming the polarizing film on a mold having a prescribed shape, a thermoplastic resin is injected into the mold to produce a thermoplastic resin casing to which the polarizing film is firmly attached. When cutting off an excess portion of the polarizing film by using a cutting die, a heater built into the cutting die is energized, and the cut-off edge portion of the polarizing film is fused by the heating of the cutting die, thus fixing the edge portion to the thermoplastic resin.

8 Claims, 22 Drawing Sheets

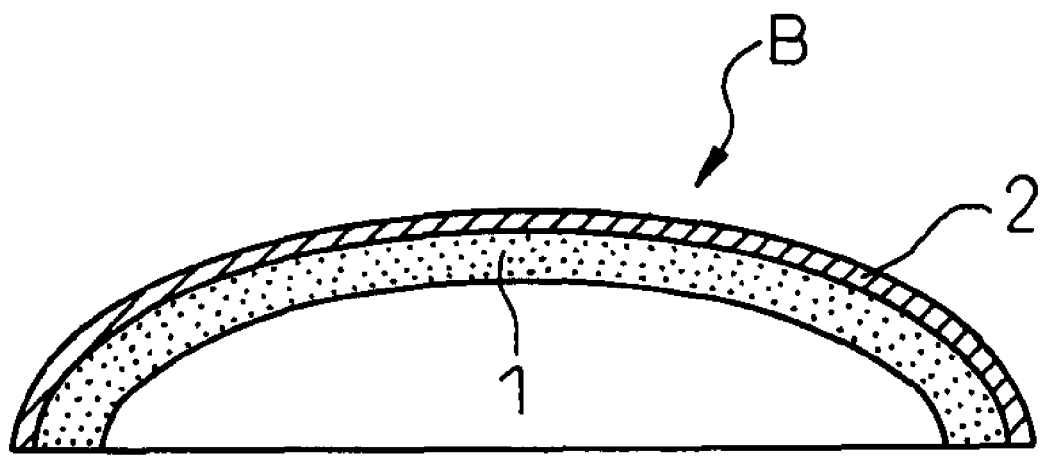

THERMOPLASTIC RESIN CASING AND METHOD FOR FABRICATING THE SAME

CROSS-REFERENCE TO RELATED APPLICATION

This application claims the priority of Japanese Patent Application Number 2006-341784, filed on Dec. 19, 2006.

BACKGROUND OF THE INVENTION

1. Field of the Invention

The present invention relates to a thermoplastic resin casing and a method for fabricating the same, and more particularly to a thermoplastic resin casing that has a three-dimensional structure having an outwardly protruding portion containing a curved surface, wherein a film having a decorative effect is laminated to a thermoplastic resin thereby providing a special decorative effect to the casing, and an edge portion of the thus laminated film is processed for fixing thereto, and a method for fabricating such a thermoplastic resin casing.

2. Description of the Related Art

Traditionally, a casing such as a container for holding an article therein or a case in which an electronic part is housed, or a casing such as a vehicle bumper, motorcycle cowl, helmet, or the like, has been fabricated in three dimensions by assembling plates made of metal or synthetic resin or like material, or has been molded as a one-piece, three-dimensional structure from a single plate. When coloring the exterior surface of the thus fabricated casing for decorative purposes, it is common to paint the surface of the casing or attach a colored sheet to it when the casing is made of metal. On the other hand, if the casing is made of a synthetic resin material, it is common to color the synthetic resin itself or to attach a colored sheet to it. Further, techniques such as plating, metal evaporation, etc. have been employed to provide metallic luster to the casing surface.

In the case of a casing made of a synthetic resin, the resin plate itself, which forms the casing, is colored to provide decorativeness to the casing. Alternatively, a colored sheet or a thin metallic film is attached or deposited as a decorative member over the surface of the resin plate that forms the casing.

In any of the resin casings fabricated by the prior art as described above, the decorative color applied to the casing surface is fixed and does not change at all or, if it does change, the change is limited. For example, in the case where a transparent colored sheet is laminated to the casing surface, the effect is such that the color of the colored sheet and the color of the casing itself seen through the transparent sheet are overlaid one on top of the other to present a mixture of two colors, but the appearance of the color does not change according to the way it is viewed.

As one method of providing such a special color effect, there is proposed a method that uses holography and creates image plane members to be applied to three-dimensional surfaces, thereby achieving a casing on which the shapes, colors, etc., of an image changes in various ways depending on the viewing angle. However, creating images to be reproduced, in particular, in white light by using the principle of holography requires a sophisticated technique and increases fabrication costs, and therefore, a method that uses holography is not a suitable method for fabricating inexpensive casings.

Apart from the method that uses holography, there is proposed a decoration method which, while employing a simple structure, can cause color patterns on a polyhedral body or a curved body to change in various ways depending on the viewing angle. In this decoration method, a casing having a polyhedral structure or a curved structure is formed from a transparent or translucent material, and the interior or exterior surface of the casing is covered with a plurality of polarizing film or plate pieces. In another proposed decoration method, a decorative thin film member, for example, a polarizing film, is bonded to one plane surface of an inorganic or resin substrate formed in a flat plate shape, to enhance richness in decoration and to add depth and three-dimensional effects to the texture.

In the above decoration method, a polarizing film or plate pieces are attached to the exterior or interior surface of the casing, which is a tedious and time-consuming process to decorate the casing, and it is not possible to cover the entire exterior or interior surface of the casing. As a result, if the pieces are attached to polygonal or curved surfaces of a casing, the decorative effect does not extend over the entire surface of the casing, and the effect is thus limited.

On the other hand, the polarizing film is bonded to the substrate to confer depth and three-dimensional effects to the texture. According to this decoration method, decorativeness can be easily provided as long as the substrate is formed in a flat plate shape. However, synthetic resin casings are often constructed in a variety of exterior shapes. As shown in the cross-sectional view of FIG. 1, when casing B is formed so as to have an outwardly protruding portion, and the entire casing is formed, for example, in a dish- or bowl-like shape, a curved surface is formed around the entire circumference of the exterior surface of the casing B.

When the exterior surface of the casing contains a curved surface, if the curved surface is uniaxial, a polarizing film can be bonded without creasing over the entire exterior surface. However, in the case of casing B shown in FIG. 1 in which a curved surface such as described by a three-dimensional curve is formed along the entire circumference of the protruding portion, it is difficult to bond a single polarizing film flatly along the curved surface without creasing over the entire surface of the protruding portion. If the polarizing film is to be bonded only to a flat surface portion of casing B, the polarizing film can be bonded without creasing, but if the flat surface portion has a protruding portion formed thereon, it is difficult to bond the polarizing film flatly without creasing over the surface of the protruding portion.

In view of the above, according to Japanese Unexamined Patent Publication No. H08-300399, there is proposed a decorative-film-coated molding fabrication method that can economically produce a molding coated with a decorative film having an excellent external appearance. In this decorative-film-coated molding fabrication method, first a preformed decorative film, which is cut to a size that extends beyond the edges of the molding to be coated with the film, is placed inside the mold, and then a molten resin is injected into the mold, allowing the edges of the decorative film to flow into the mold flash. Then, after the resin is cooled, and the molding is removed from the mold, the edges of the decorative film are trimmed off together with the mold flash, thus completing the fabrication of the molding coated with the decorative film.

However, in the decorative-film-coated molding fabrication method proposed above, since the preformed decorative film is placed inside the mold in which the resin is molded to produce the molding coated with the film, the decorative film must be sufficiently thick enough that it can retain its intended shape to a certain extent after preforming. Compared with this decorative film, the previously described polarizing film is thin and does not have a thickness suitable for such preforming, and therefore, the above fabrication method cannot be used in applications where a decorative effect is provided by attaching a polarizing film.

In view of the above, according to Japanese Unexamined Patent Publication No. H08-156016, there is proposed an in-mold decoration injection molding method by which a thin decorative film not suitable for preforming is applied to the surface of a resin molding simultaneously with the molding of the resin. The molding machine used in this in-mold decoration injection molding method comprises a cavity block and a core block disposed opposite each other in such a manner as to be closed and opened relative to each other, and a heating unit which is movable in a reciprocating fashion between an opposing space formed by the cavity block and core block and spaced apart from the opposing space.

In this molding machine, decorative film precut to a predetermined size is held onto the heating unit, and the heating unit is moved into the opposing space, and the decorative film while being heated by the heating unit contacts the mold surface of the cavity block by the application of vacuum. After retracting the heating unit from the opposing space, the cavity block and the core block are closed under pressure, and injection molding is performed, thereby laminating the decorative film to the surface of the molding. When the mold is opened, the heating unit is moved forward relative to the molding left on the core block, and the edges of the decorative film laminated to the molding are trimmed off to conform to the shape of the molding, thus removing excess film.

Further, according to Japanese Unexamined Patent Publication Nos. 2004-106598, 2005-119404, 2006-168267, etc., fabrication methods are proposed for moldings formed from foamed plastic substrates, wherein the decorative film and the foamed plastic substrate are bonded together during the molding of the foamed plastic substrate. In the molding fabrication method disclosed in Japanese Unexamined Patent Publication No. 2004-106598, when molding the foamed plastic substrate, the outer edge of the substrate is compressed flat, and the thus compressed flat portion is trimmed to make the cut end less visible from the outside, or the compressed flat portion is folded inwardly, thereby enhancing the appearance of the outer edge while increasing the rigidity of the structure.

In the molding fabrication method disclosed in Japanese Unexamined Patent Publication No. 2005-119404, a groove for hiding the cut end at the edge portion of the product is formed on the mold, and the appearance of the outer edge is enhanced by cutting the groove or by forming a product face substantially perpendicular to the vertical mold opening direction (operating direction) around the periphery of the product and then forming a folding portion extending from the product face into a flat shape. On the other hand, in the molding fabrication method disclosed in Japanese Unexamined Patent Publication No. 2006-168267, the excess edge of the foamed plastic substrate is cut off at the shear edge portion between the upper and lower molds for molding the product, and then the folding portion of the decorative film extending outwardly from the cut line is folded behind the foamed plastic substrate, thereby enhancing the appearance of the outer edge.

As described above, each of the molding fabrication methods for enhancing the appearance of the outer edge of the molding having a decorative film bonded thereto has concerned a the case in which the molding is formed from a foamed plastic substrate. However, in the case of a molding formed from a thermoplastic resin, these molding fabrication methods for enhancing the appearance of the outer edge of the molding cannot be directly used.

In view of the above, there is proposed a fabrication method for bonding a thin decorative film such as a polarizing film to a thermoplastic resin molding, wherein the decorative film and the thermoplastic resin plate are bonded together during the molding of the thermoplastic resin. In this fabrication method, first the decorative film is placed on a mold having a recess of a prescribed shape, and the recessed portion is evacuated to thermoform the decorative film into the prescribed shape; then, while retaining the film in that shape, an injection molding die having a shape that matches the recessed shape of the mold is placed onto the mold with the decorative film interposed therebetween, and the thermoplastic resin is injected through an injection hole formed in the injection molding die. After the injected thermoplastic resin has been formed into the prescribed shape in the recess of the mold, the injection molding die is withdrawn; in this way, the thermoplastic resin is formed into the prescribed shape only on the interior side of the decorative film in such a manner as to conform to the interior surface of the decorative film formed and retained in the prescribed shape. Then, any excess film is removed by trimming.

However, in the molding fabrication method proposed above, the molding formed from the thermoplastic resin is trimmed at its outer edge, while the decorative film cut at its outer edge is bonded to the thermoplastic resin, the endmost portion of the decorative film may partially delaminate and become jagged, depending on the handling of the molding or due to the chafing of the outer edge during use. As a result, while the decorative film can be bonded flatly without creasing over the surface of the molding, there arises a problem that the appearance of the molding as a whole degrades.

It is accordingly an object of the present invention to provide a thermoplastic resin casing that has a three-dimensional structure having an outwardly protruding portion containing a curved surface, wherein a film having a polarizing effect is laminated as a decorative film to a thermoplastic resin thereby providing a special decorative effect to the casing, and an edge portion of the laminated film is processed for fixing to an outer edge of the casing, and a method for fabricating such a thermoplastic resin casing.

SUMMARY OF THE INVENTION

To solve the above problem, in a thermoplastic resin casing having a protrusion of a prescribed shape containing a curved surface according to the present invention, a film having a polarizing effect is attached so as to conform with the prescribed shape to a surface of a thermoplastic resin body which forms the protrusion, and an edge portion of the film is fixedly secured to the thermoplastic resin body.

The film is laminated to the thermoplastic resin body under heat and pressure when the thermoplastic resin body is injection-molded into the prescribed shape; further, the edge portion of the film is secured to the thermoplastic resin body by fusing, wherein the edge portion of the film is secured to the thermoplastic resin body by embedding a portion of the film into the thermoplastic resin body when the thermoplastic resin body is injection-molded into the prescribed shape, or the edge portion of the film is fixedly secured to the thermoplastic resin body by being embedded into the surface of the thermoplastic resin body when the thermoplastic resin body is injection-molded into the prescribed shape.

In a method for fabricating a thermoplastic resin casing according to the present invention, film having a polarizing effect is placed on a mold having a recess of a prescribed shape and is formed into the shape of the recess; after the film is formed, an injection molding die is placed onto the mold with the film interposed therebetween, and a thermoplastic resin is injected into a recess formed by the film, thereby forming the thermoplastic resin casing; and an excess portion of the film is cut off using a thermal cutting tool, and a cut-off edge portion of the film is fixedly secured to the thermoplastic resin casing by fusing the edge portion by the thermal cutting tool.

Then, while holding the thermal cutting tool stationary at a position where the excess portion of the film was cut off, the thermal cutting tool is operated to generate heat, thereby fusing the cut-off edge portion of the film.

In another method for fabricating a thermoplastic resin casing according to the present invention, a film having a polarizing effect is placed on a mold having a recess of a prescribed shape and is formed into the shape of the recess; after the film is formed, an injection molding die is placed onto the mold with the film interposed therebetween, and a thermoplastic resin is injected into a recess formed by the film, thereby forming the thermoplastic resin casing; and a thermal cutting tool is placed against an edge portion of the film laminated to the thermoplastic resin casing, and the edge portion of the film is fused by the thermal cutting tool, thereby securing the edge portion fixedly to the thermoplastic resin casing.

Here, the edge portion of the film is formed in an excess film portion, which extends from a film-laminated surface of the thermoplastic resin casing, the excess film portion is placed in contact with an end portion or a rear portion of the thermoplastic resin casing which is a portion continuous with the film-laminated surface, and the edge portion of the film is fused by the thermal cutting tool placed against the edge portion, thereby securing the edge portion fixedly to the thermoplastic resin casing. Further, the edge portion of the film is fused by the thermal cutting tool placed against the edge portion, thereby securing the edge portion to the thermoplastic resin casing, while at the same time, cutting off the excess film portion.

In another method for fabricating a thermoplastic resin casing according to the present invention, film having a polarizing effect is placed on a mold having a recess of a prescribed shape and is formed into the shape of the recess, and after the film is formed, an injection molding die is placed onto the mold with the film interposed therebetween, and a slide die provided in the mold is pushed into the recess. A thermoplastic resin is then injected into a recess formed by the film, thereby forming the thermoplastic resin casing, and a portion of the film is secured to the thermoplastic resin casing by embedding the portion into the thermoplastic resin casing at a position where the slide die is pushed in.

Then, after the thermoplastic resin casing is formed, the slide die is pulled out of the recess, and a gap formed at the position where the slide die was pushed in is crushed by utilizing a molding pressure held in the recess, thereby embedding the portion of the film formed inside the gap into the thermoplastic resin casing and thus securing the portion to the thermoplastic resin casing, wherein after the portion of the film is embedded into the thermoplastic resin casing and secured thereto, an excess portion of the film is removed.

Further, the film is formed to a prescribed size that fits in the recess, the film is placed on the mold and formed into the shape of the recess, and an edge portion of the film is fixedly secured to the thermoplastic resin casing by embedding the edge portion into the thermoplastic resin casing at the position where the slide die is pushed in.

Alternatively, the film is formed with a plurality of perforations conforming to a prescribed size that fits in the recess, the film is placed on the mold and formed into the shape of the recess, and after the film is formed, the injection molding die is placed onto the mold with the film interposed therebetween. The slide die provided in the mold is then pushed into the recess at a position where the perforations are located, and the thermoplastic resin is injected into the recess formed by the film, thereby forming the thermoplastic resin casing. The perforations of the film are embedded into the thermoplastic resin casing and secured thereto, and after the slide die is pulled out, an excess portion of the film is separated by utilizing the perforations.

In another method for fabricating a thermoplastic resin casing according to the present invention, a film having a polarizing effect is placed on a mold having a recess of a prescribed shape and is formed into the shape of the recess; after the film is formed, an injection molding die is placed onto the mold with the film interposed therebetween, and a thermoplastic resin is injected into a recess formed by the film, thereby forming the thermoplastic resin casing. After the thermoplastic resin casing is formed, a slide die provided in the mold is pushed into the recess with the film interposed therebetween, a portion of the film is secured to the thermoplastic resin casing by embedding the portion into the thermoplastic resin casing at a position where the slide die is pushed in, and an excess portion of the film is removed.

Here, the excess portion of the film is removed by being cut off when the slide die is pushed into the recess.

In another method for fabricating a thermoplastic resin casing according to the present invention, a film having a polarizing effect is placed on a mold having a recess of a prescribed shape and is formed into the shape of the recess. After the film is formed, an injection molding die is placed onto the mold with the film interposed therebetween, and a slide die provided in the mold is pushed into the recess. Then a thermoplastic resin is injected into a recess formed by the film, thereby forming the thermoplastic resin casing, and an excess portion of the film is cut off at a position where no decoration is needed on a surface of the thermoplastic resin casing.

As described above, according to the present invention, when injection-molding a thermoplastic resin casing having a protrusion of a prescribed shape containing a curved surface, a film having a polarizing effect is laminated by fusing to the surface of the thermoplastic resin casing so as to conform with the prescribed shape, and the edge portion of the film is secured to the thermoplastic resin body by fusing, wherein the edge portion of the film is fixedly secured to the thermoplastic resin body by embedding a portion of the film into the thermoplastic resin body when the thermoplastic resin body is injection-molded, or the edge portion of the film is secured to the thermoplastic resin body by being embedded into the surface of the thermoplastic resin body when the thermoplastic resin body is injection-molded. As a result, the edge portion of the film laminated to the surface of the casing is not jagged after the excess portion of the film is removed, and the appearance of the thermoplastic resin casing can thus be enhanced.

Further, according to the thermoplastic resin casing fabrication method of the present invention, a film having a polarizing effect is placed on a mold having a recess of a prescribed shape and is formed into the shape of the recess, and after the film is formed, an injection molding die is placed onto the mold with the film interposed therebetween, and a thermoplastic resin is injected into a recess formed by the film, thereby forming the thermoplastic resin casing. In this way, not only can a thin film be bonded flatly without creasing over the surface of the casing, but when removing the excess portion of the film, since the remaining edge portion of the film is secured to the thermoplastic resin by fusing, that is, since the edge portion of the film is secured to the thermoplastic resin body by embedding a portion of the film into the thermoplastic resin body when the thermoplastic resin body is injection-molded, or since the edge portion of the film is secured to the thermoplastic resin body by being embedded into the surface of the thermoplastic resin body when the thermoplastic resin body is injection-molded, the edge portion of the film laminated to the surface of the casing is not jagged after the excess portion of the film is removed, and the appearance of the thermoplastic resin casing can thus be enhanced.

In this way, according to the present invention, not only can the casing be easily fabricated by conferring the depth and three-dimensional effects and by providing special effects, such as smoothly changing iridescent color effects that cannot be rendered to the casing by such techniques as colored resin, painting, plating, evaporation, etc., but a fabrication method can be provided that is effective in improving the finished quality of the casing and prevent the formation of jagged edges at the edge portion of the casing.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a cross-section view of a thermoplastic resin casing in which a decoration is applied to a thermoplastic resin;

DESCRIPTION OF THE PREFERRED EMBODIMENTS

Next, the embodiments of a thermoplastic resin casing and a method for fabrication thereof according to the present invention will be described, but before proceeding to the description of the embodiments, a previously proposed thermoplastic resin casing fabrication method that forms the basis for the thermoplastic resin casing and its fabrication method according to the present invention will be described in order to clarify the features and advantages of the embodiments of the present invention.

It is proposed to fabricate a thermoplastic resin casing on which a protrusion is formed in a variety of ways and the entire surface of which is covered with a polarizing film to provide special decorative effects to the casing, wherein the casing is fabricated either by molding a laminated structure constructed by bonding the polarizing film to a thermoplastic resin plate or by injection-molding a thermoplastic resin onto the polarizing film formed in a prescribed shape.

FIG. 2 shows a series of cross-sectional views illustrating by way of example a sequence of processing steps in the fabrication method of the thermoplastic resin casing provided with such special decorative effects. FIG. 3 shows a flowchart illustrating the sequence of processing steps in the fabrication method of the thermoplastic resin casing. For simplicity of illustration, the casing B shown in this example, unlike the casing B shown in FIG. 1, is a hollow cylinder having a rectangular cross section. The process according to the fabrication method of FIG. 3 comprises two main processes, the resin molding process P1 and the trimming process p2 that follows.

The mold 3 used in the resin molding process P1 is provided with one or more evacuation holes communicating with its recess; in the manufacturing process of the thermoplastic resin casing shown in FIG. 2, the mold 3 is provided with one evacuation hole 4 as a representative example. First, in FIG. 2A, the polarizing film 2 is placed on the mold 3 having the recess of the prescribed shape (step S1). Next, as shown in FIG. 2B, the polarizing film 2 is thermoformed into the prescribed shape by evacuating air from the recess through the evacuation hole 4 (step S2).

Figure 2A:
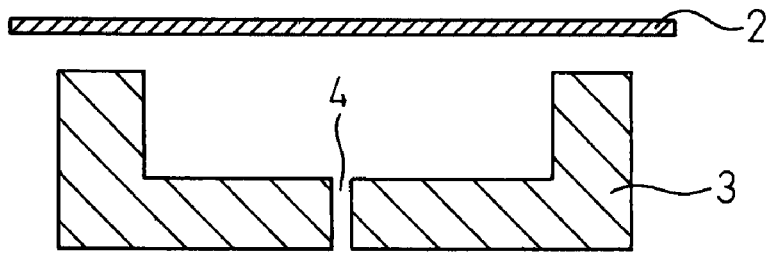
FIGS. 2A to 2E are cross-sectional views explaining processing steps in a fabrication method for a thermoplastic resin casing to which a polarizing film is laminated.
Figure 2B:
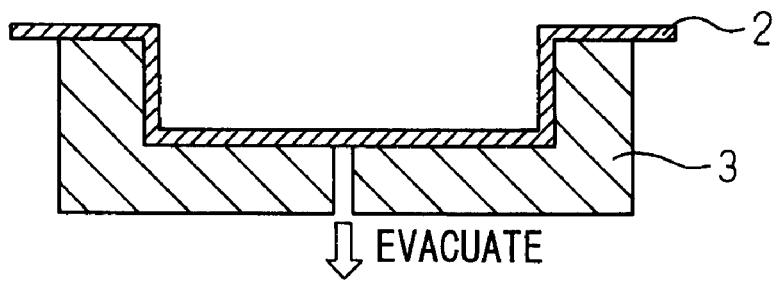
Figure 2C:
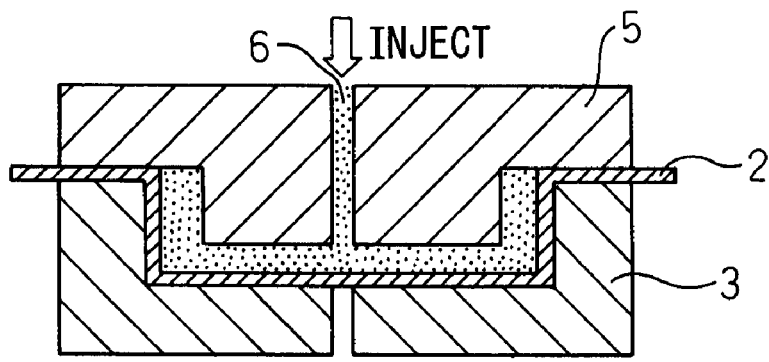
Figure 3:
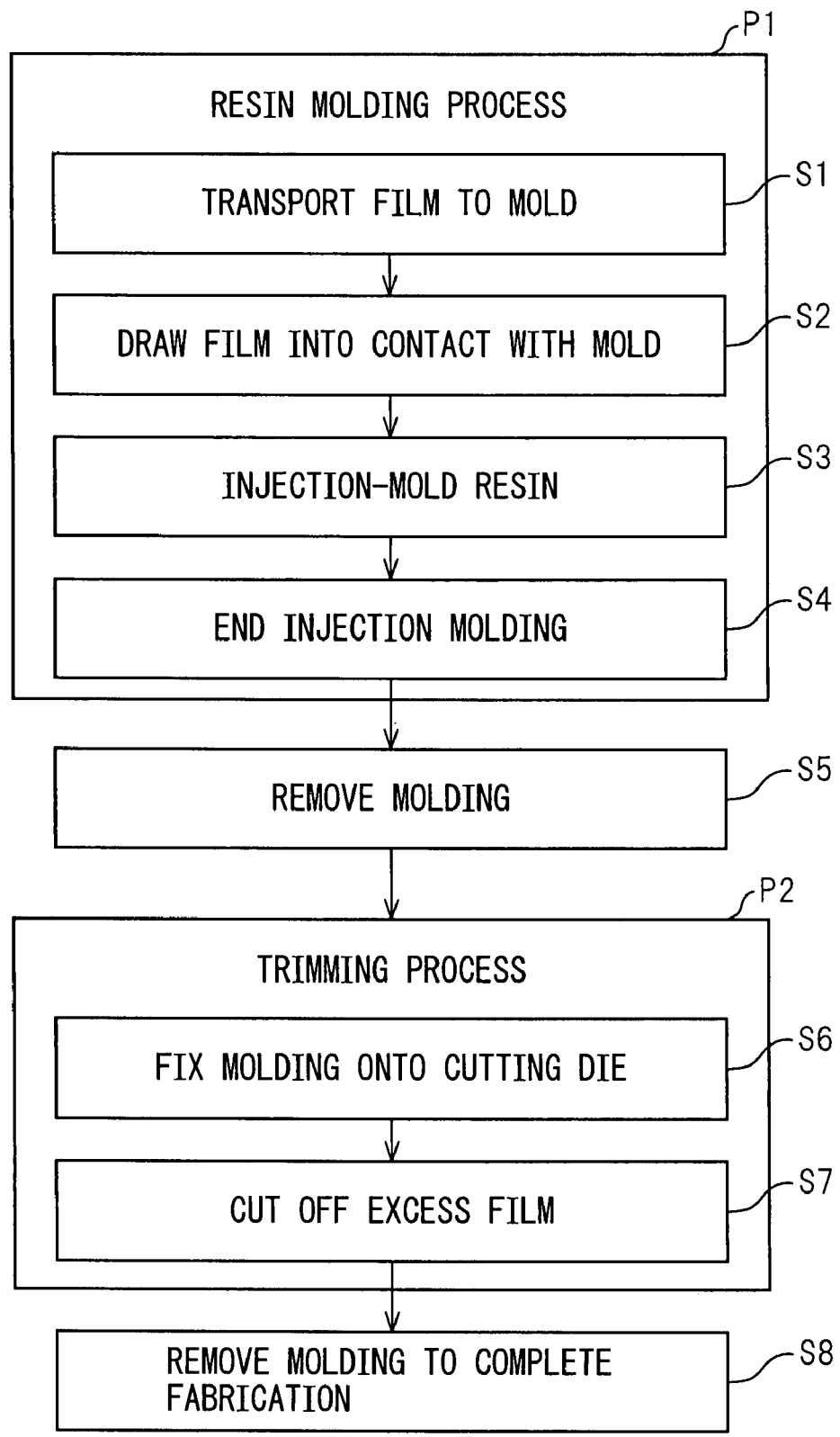
FIG. 3 is a flowchart explaining the sequence of processing steps in the fabrication method for the thermoplastic resin casing to which the polarizing film is laminated.

After forming the polarizing film 2 into the prescribed shape, a injection molding die 5 having a shape that matches the recessed shape of the mold 3 is placed onto the mold 3, as shown in FIG. 2C, by interposing therebetween the polarizing film 2 retained in the prescribed shape. Then, the thermoplastic resin is injected through the injection hole 6 provided in the injection molding die 5 (step S3).

Figure 2D:
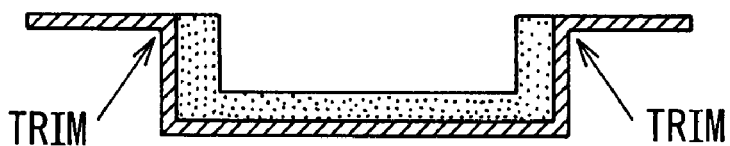
Figure 2E:
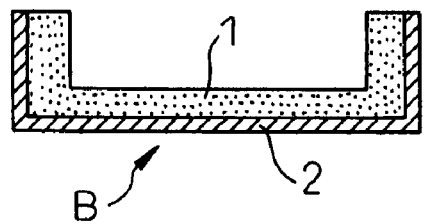

After the injected thermoplastic resin has been formed into the prescribed shape in the recess of the mold 3 (step S4), the injection molding die 5 is withdrawn and the molding is removed from the mold 3 (step S5); in this way, the thermoplastic resin is formed into the prescribed shape on only the interior side of the polarizing film 2 in such a manner as to conform to the interior surface of the polarizing film 2 formed and retained in the prescribed shape, as shown in FIG. 2D. Then, in FIG. 2D, the molding is held fixed at positions indicated by arrows onto a cutting blade such as a cutting die (step S6), and the polarizing film 2 is cut by the cutting blade (step S7), thus trimming the film to remove excess film. In this way, the fabrication of the casing B of the thermoplastic resin 1 cylindrical in shape and rectangular in cross section is completed as shown in FIG. 2E (step S8). The casing B here corresponds to the casing B shown in FIG. 1.

Figure 4A:
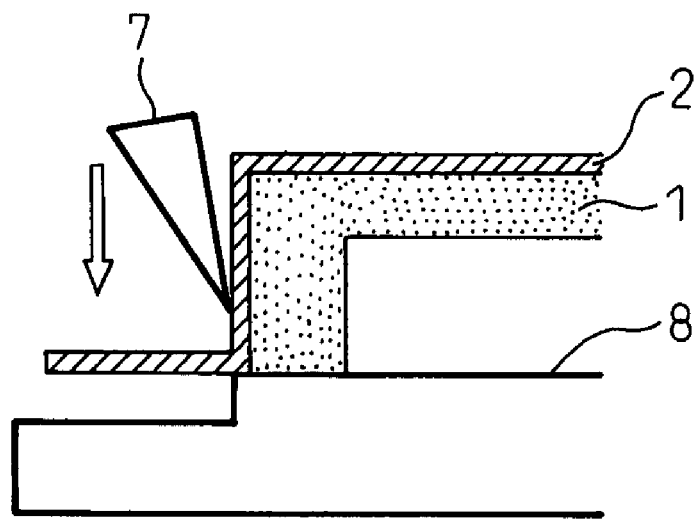
FIGS. 4A to 4C are cross-sectional views explaining a trimming process in the fabrication method for the thermoplastic resin casing to which the polarizing film is laminated.
Figure 4B:
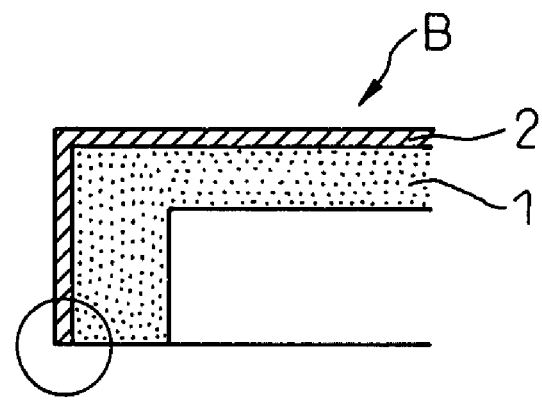

FIGS. 4A and 4B show cross-sectional views illustrating the details of the processing steps in the trimming process P2 shown in FIG. 3. FIG. 4A shows the condition in step S6, in which the thermoplastic resin 1 and the polarizing film 2 together formed in the prescribed shape are placed on a cutting die base 8 so that only the polarizing film 2 can be cut off around its circumference at the position indicated by an arrow in FIG. 2D, and the cutting die 7 is placed in the matching position.

Then, when the polarizing film 2 is registered with the cutting position indicated by the arrow, the cutting die 7 is pushed down as indicated by an open arrow, to cut off the excess portion of the polarizing film 2, i.e., the excess portion not bonded to the thermoplastic resin 1. In this way, the fabrication of the casing B of the thermoplastic resin 1 cylindrical in shape and rectangular in cross section, like the one shown in FIG. 2E, is completed as shown in FIG. 4B.

However, while the polarizing film 2 is bonded flatly so as to conform to the surface of the thermoplastic resin 1 of the thus formed casing, the edge portion of the casing B indicated by a circle in FIG. 4B may become jagged due to delamination or incomplete cutting at the edge of the polarizing film 2, which can occur when cutting the polarizing film 2 or during the handling of the casing B.

Figure 4C:
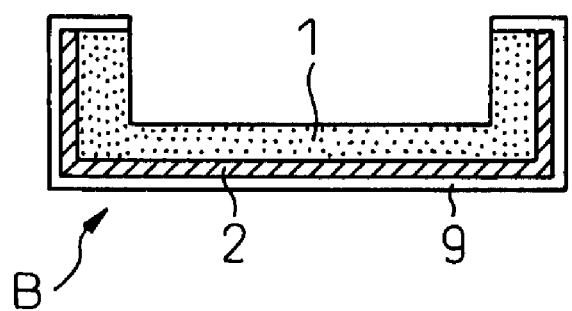

To address this problem, the thermoplastic resin casing B may be constructed by forming a clear coat layer 9 on top of the polarizing film 2, as shown in FIG. 4C. The clear coat layer 9 need only have a certain degree of transparency and may be colored. The coat layer 9 made of a thermoplastic resin may be formed over the entire surface of the polarizing film 2 laminated to the thermoplastic resin 1, or may be formed by double molding or the like in which a resin molding is formed on top of the molded structure. The coat layer 9 is formed extending beyond the edge of the thermoplastic resin 1 so as to cover the edge portion of the laminated polarizing film 2.

By forming the coat layer 9 at least around the entire circumference along the edge of the casing B, the formation of jagged edges can be prevented or jagged edges, if created, can be concealed. However, since an extra coat layer has to be formed, this method requires an extra processing step and increases cost. This method also lessens the advantage in that a thermoplastic resin casing provided with special decorative effects can be fabricated by a simple process, which forms the polarizing film simultaneously with the injection molding of the thermoplastic resin of the prescribed shape.

In view of the above, the present invention provides a thermoplastic resin casing fabrication method, which forms the polarizing film simultaneously with the injection molding of the thermoplastic resin of the prescribed shape, wherein provisions are made to process the edge portion of the polarizing film for fixing at the edge of the casing, thereby eliminating the need for an extra layer formation step, while enhancing the finished quality of the casing and preventing the occurrence of jagged edges at the edge portion of the casing.

Next, the first to the sixth embodiments of the thermoplastic resin casing and its fabrication method according to the present invention will be described with reference to the drawings.

First Embodiment

Figure 5A:
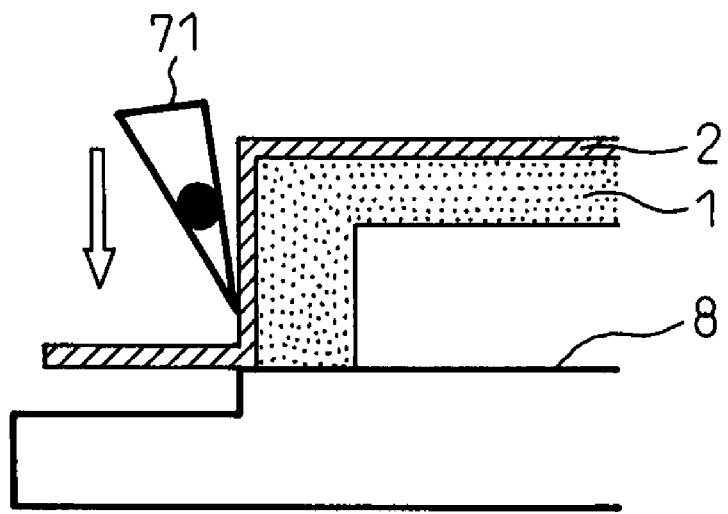
FIGS. 5A and 5B are cross-sectional views explaining a trimming process in a thermoplastic resin casing fabrication method according to a specific example of a first embodiment.

FIG. 5 shows cross-sectional views illustrating processing steps in a specific example of the thermoplastic resin casing fabrication method according to the first embodiment. The thermoplastic resin casing fabrication method according to this specific example is based on the fabrication method shown in the flowchart of FIG. 3, and FIG. 5A shows the condition corresponding to the fabrication step shown in FIG. 4A.

The fabrication method according to the specific example of the first embodiment shown in FIG. 5A differs from the fabrication method shown in FIG. 4A in that while the cutting die 7 in the earlier described method has been used to simply cut off the excess portion of the polarizing film 2, the fabrication method hereinafter described uses a cutting die 71 having a built-in heater as indicated by a solid circle, and this cutting die 71 is used to cut off the excess portion of the polarizing film 2.

Figure 6:
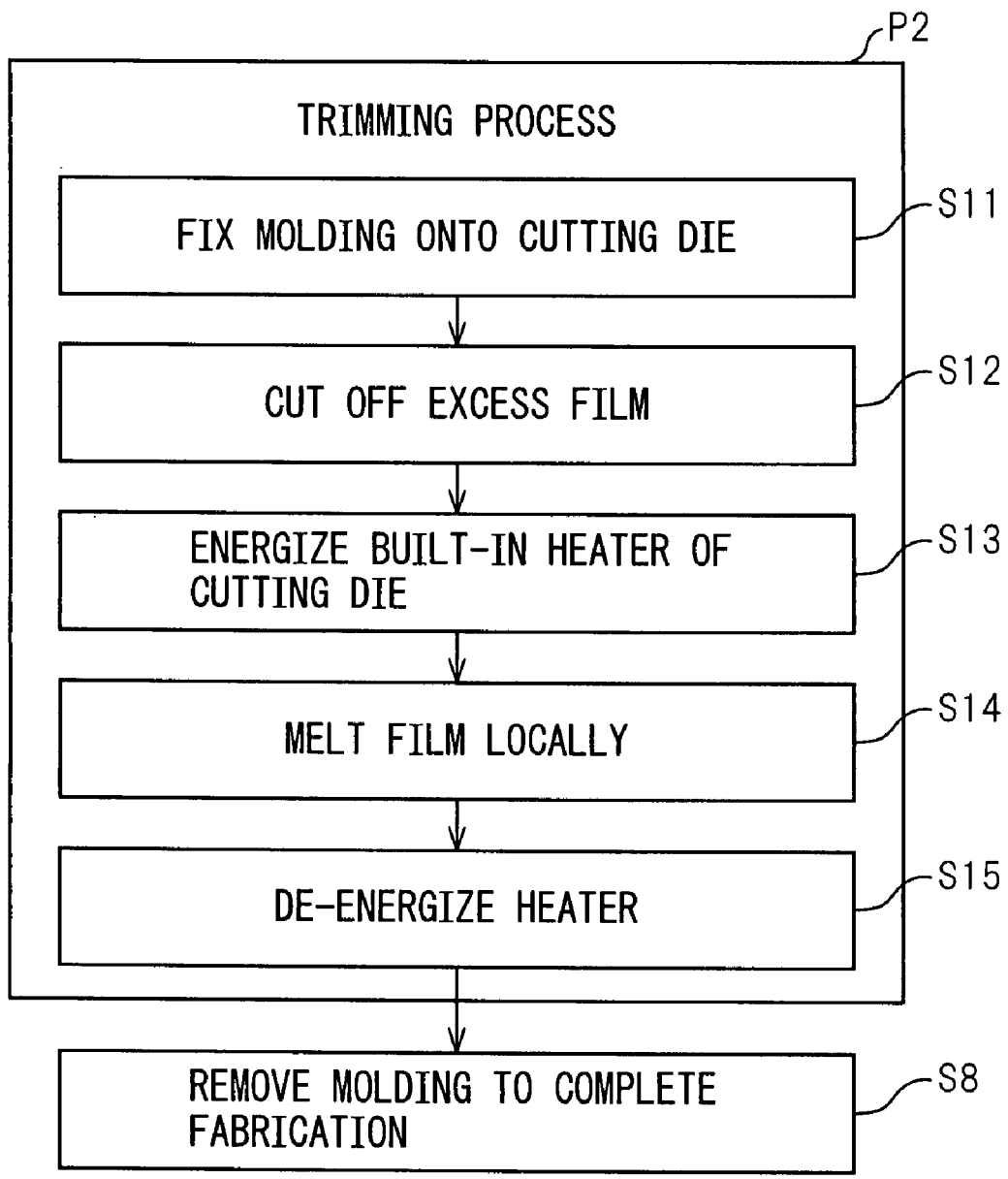
FIG. 6 is a flowchart explaining the sequence of processing steps in the fabrication method according to the specific example of the first embodiment.

FIG. 6 shows a flowchart illustrating the sequence of processing steps in the fabrication method according to this specific example. Since the fabrication method of this specific example is based on the fabrication method shown in FIG. 3 as described above, the resin molding process P1 in the first half of the sequence is not shown in FIG. 6, but only the trimming process P2 in the second half that follows the molding process P1 is shown.

To describe the thermoplastic resin casing fabrication method according to this specific example, first the molding removed from the mold after the injection molding of the resin in the resin molding process P1 is transferred to the trimming process P2. In the trimming process P2, the molding is fixed to the cutting die base 8, as shown in FIG. 5A (step S11). Here, the molding is fixed at a position where the excess portion of the polarizing film is cut off by the cutting die 71, that is, the cutting edge of the cutting die 71 is aligned with the outer edge of the thermoplastic resin casing.

When the molding is thus fixed to the cutting die base 8, the cutting die 71 is lowered as indicated by an open arrow to cut off the excess film from the molding, thus removing the excess film from the polarizing film 2 (step S12). Here, when the excess film is cut off, the cutting die 71 is not lifted immediately, but is held stopped at the lowered position.

In this stopped condition, the heater built into the cutting die 71 is energized to heat the cutting die 71 (step S13). The heating causes the polarizing film 2 to melt at the portion thereof contacted with the cutting die 71 (step S14). When the portion of the polarizing film 2 is melted, the heater is de-energized (step S15) to finish the fixing process of the polarizing film 2. Then, the cutting die 71 is lifted, and the molding is removed, completing the fabrication of the thermoplastic resin casing having a prescribed shape (step S8).

Figure 5B:
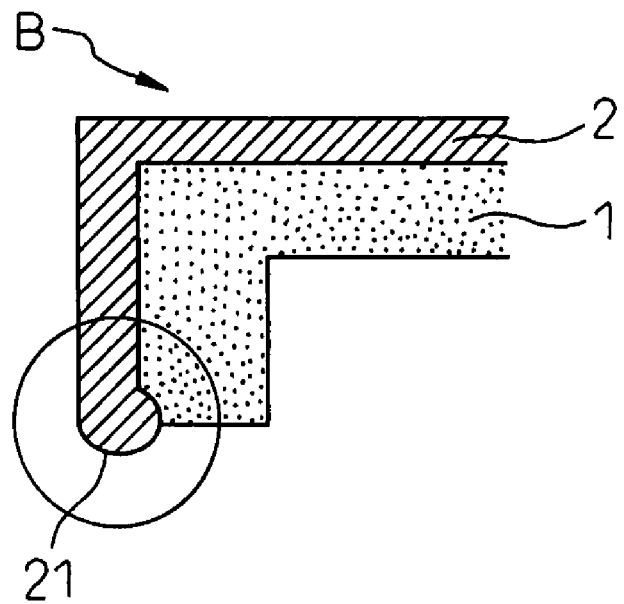

A portion of the thus completed thermoplastic resin casing B is shown in cross section in FIG. 5B. Here, an edge portion of the casing B is shown in enlarged form, the edge being shown enclosed by a circle. As shown in FIG. 5B, when the edge portion of the polarizing film 2 is heated by the cutting die 71 in step S13, the edge portion melts, and a portion of the thermoplastic resin of the casing B also melts. Thereafter, the molten portions are cooled and solidified, and the edge portion of the polarizing film 2 is thus secured to the thermoplastic resin by heating.

As described above, in the thermoplastic resin casing fabrication method according to the specific example of the first embodiment, since the edge portion of the polarizing film 2 cut by the cutting die is heated and melted and is thus fixedly secured to the thermoplastic resin at the edge of the casing B, if jagged edges are formed when cutting off the excess film of the polarizing film 2, the jagged edges are planarized as the film is heated and melted, and the edge portion of the film is thus secured to the thermoplastic resin. Furthermore, since the edge portion is rounded when planarized, the polarizing film 2 does not easily delaminate due to chafing, etc. during use of the casing B.

Figure 7:
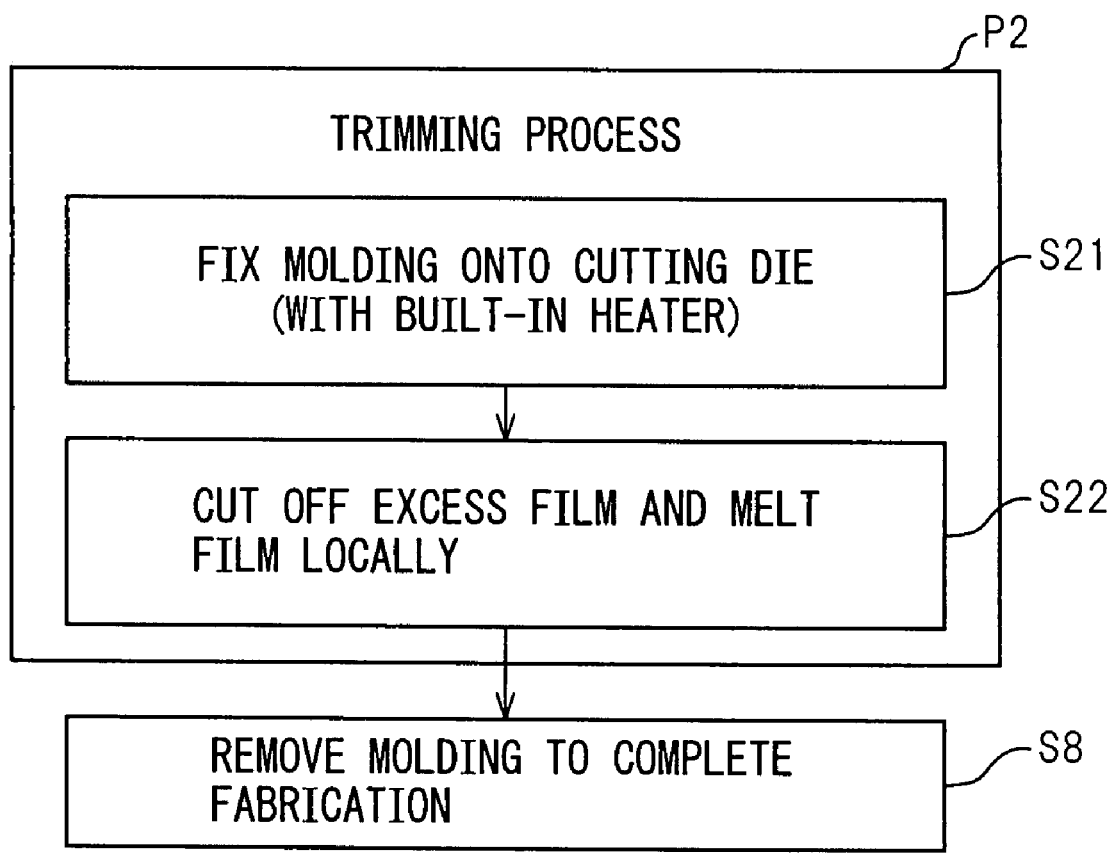
FIG. 7 is a flowchart explaining the sequence of processing steps in a fabrication method according to a modified example of the first embodiment.

FIG. 7 shows a flowchart illustrating the sequence of processing steps in a fabrication method according to a modified example of the above specific example. Like the fabrication method shown in FIG. 6, the fabrication method of this modified example is also based on the fabrication method shown in FIG. 3 as earlier described. Accordingly, the resin molding process P1 in the first half of the sequence is not shown in FIG. 7, but only the trimming process P2 in the second half is shown.

To describe the thermoplastic resin casing fabrication method according to the modified example, first the molding removed from the mold after the injection molding of the resin in the resin molding process P1 is transferred to the trimming process P2. In the trimming process P2, the molding is fixed to the cutting die base 8, as shown in FIG. 5A (step S21). Here, the position where the excess portion of the polarizing film 2 is cut off by the cutting die 71 is the same as that shown in the fabrication process of FIG. 6, and the molding is fixed in a position by aligning the cutting edge of the cutting die 71 with the outer edge of the thermoplastic resin casing.

When the molding is thus fixed to the cutting die base 8, the heater built into the cutting die 71 is energized to heat the cutting die 71, and in this condition, the cutting die 71 is lowered as indicated by the open arrow to cut off the excess film from the molding, thus removing the excess film from the polarizing film 2, while at the same time, causing the polarizing film 2 to melt at the portion thereof contacted with the cutting die 71 (step S22). When the portion of the polarizing film 2 melts, the fixing process of the polarizing film 2 is finished, and with the heater de-energized or kept energized, the cutting die 71 is lifted, and the molding is removed, completing the fabrication of the thermoplastic resin casing having the prescribed shape (step S8).

The difference between the fabrication process of the specific example and the fabrication process of the modified example lies in the energization timing of the built-in heater of the cutting die 71, otherwise there is no difference between them, that is, the edge portion of the polarizing film 2 is heated by the cutting die 71 and thus melts, and a portion of the thermoplastic resin of the casing B also melts. The cross section of a portion of the thus completed thermoplastic resin casing B is the same as that shown in FIG. 5B, and the edge portion of the polarizing film 2 is thus secured to the thermoplastic resin by heating.

Second Embodiment

The first embodiment described above has dealt with an example in which the excess portion of the polarizing film 2 is cut off at the outer edge of the thermoplastic resin casing, but in the thermoplastic resin casing fabrication method according to the second embodiment hereinafter described, the excess portion of the polarizing film is cut off at a position spaced a prescribed distance away from the edge of the casing, allowing the edge portion of the polarizing film to extend beyond the edge of the casing, and the extended portion of the film is bent inwardly at the edge of the casing at which the extended portion of the film is processed for fixing. The inward portion of the edge of the casing is a portion where no decoration is needed or a portion that is hidden from view when the casing is in use.

Figure 8A:
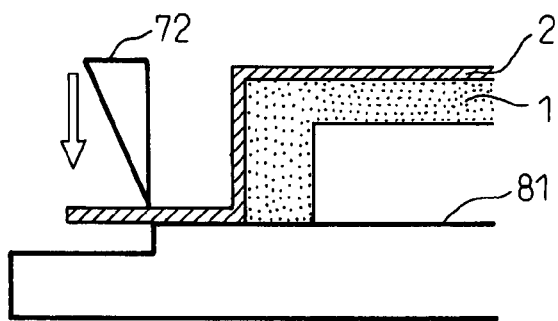
FIGS. 8A to 8E are cross-sectional views explaining a trimming process in a thermoplastic resin casing fabrication method according to a specific example of a second embodiment.
Figure 8B:
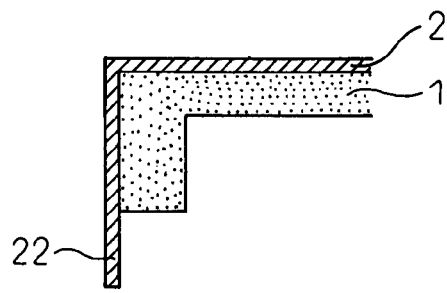
Figure 8C:
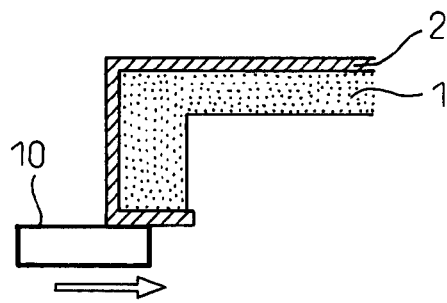
Figure 8D:
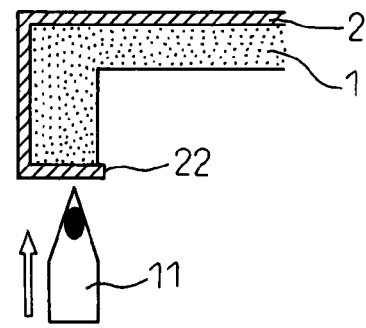
Figure 8E:
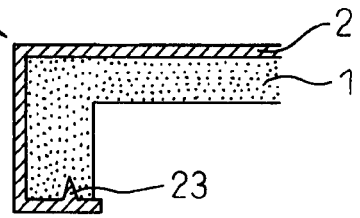
Figure 9:
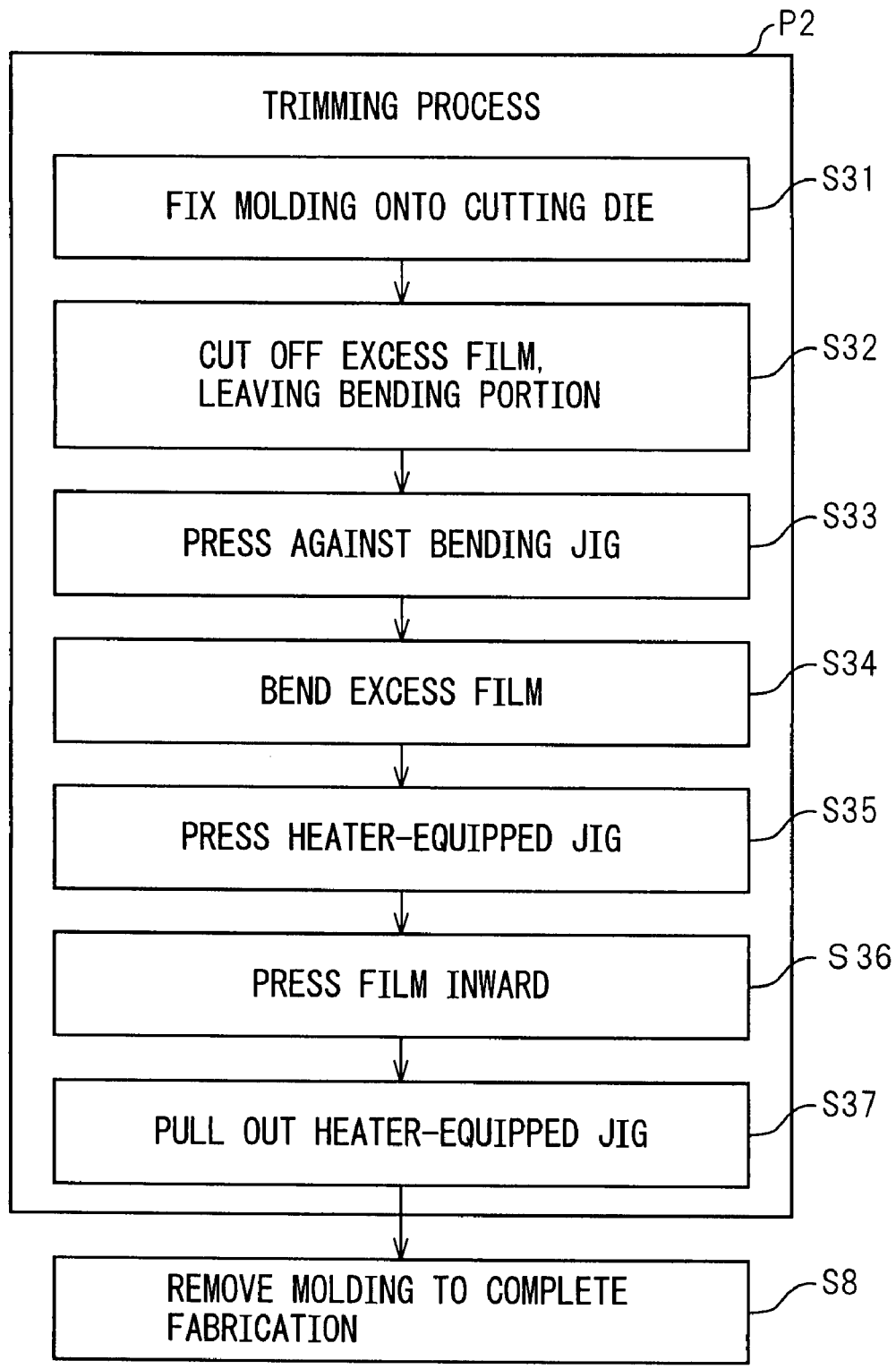
FIG. 9 is a flowchart explaining the sequence of processing steps in the fabrication method according to the specific example of the second embodiment.

FIG. 8 shows a series of cross-sectional views illustrating a specific example of the thermoplastic resin casing fabrication method according to the second embodiment, and FIG. 9 shows a flowchart illustrating the sequence of processing steps in the fabrication method. The thermoplastic resin casing fabrication method according to this specific example also is based on the fabrication process shown in the flowchart of FIG. 3. In FIGS. 8 and 9, the resin molding process P1 is not shown, but only the trimming process P2 that follows the molding process P1 is shown.

The fabrication process according to the fabrication method of the specific example of the second embodiment shown in FIG. 8 differs from the fabrication process shown in FIG. 4A in that while, in the earlier described fabrication process, the excess portion of the polarizing film 2 has been cut off at the outer edge of the casing by the cutting die 7, in the fabrication process hereinafter described the polarizing film is cut off at a position spaced a prescribed distance away from the edge of the casing, leaving the edge portion of the polarizing film to extend beyond the edge of the casing. This extended portion is bent in the subsequence process.

To describe the thermoplastic resin casing fabrication method according to the specific example of the second embodiment, first the molding removed from the mold after the injection molding of the resin in the resin molding process P1 is transferred to the trimming process P2. In the trimming process P2, the molding is fixed to the cutting die base 81, as shown in FIG. 8A (step S31). Here, the outer edge of the molding is fixed to the cutting die base 81 with the cutting edge of the cutting die 72 positioned so that the edge of the film can be cut off at a position spaced a prescribed distance away from the outer edge of the thermoplastic resin casing.

When the molding is thus fixed to the cutting die base 81, the cutting die 72 is lowered as indicated by an open arrow to cut off the excess film from the molding, thus removing the excess film from the polarizing film 2 while leaving only the extended portion 22 for bending (step S32).

Next, as shown in FIG. 8C, a bending jig 10 is placed against the extended portion 22 of the polarizing film 2 at the edge of the molding (step S33), and then the bending jig 10 is moved inward of the edge of the molding as indicated by an open arrow, thus bending the extended portion 22 (step S34).

When the extended portion 22 is bent inward, a pressing jig 11 having a built-in heater as indicated by a solid circle is placed against the extended portion 22, as shown in FIG. 8D, and the extended portion 22 is pressed against the molded thermoplastic resin 1 while heating the pressing jig 11 by the heater (step S35). At this time, with the pressing of the pressing jig 11, a portion of the extended portion 22 of the polarizing film 2 is pressed into the thermoplastic resin (step S36).

Then, the thus applied pressing jig is withdrawn to complete the fixing process of the extended portion, i.e., the bent portion, of the polarizing film 2 (step S37). The fabrication of the thermoplastic resin molding is thus completed (step S8). A portion of the completed thermoplastic resin casing B is shown in cross section in FIG. 8E. Here, the edge portion of the casing B is shown in enlarged form, and the portion processed for fixing is indicated at reference numeral 23.

As described above, in the thermoplastic resin casing fabrication method according to the specific example of the second embodiment, the polarizing film 2 is cut off by the cutting die, leaving the bending portion, and the bending portion thus left is bent at the edge of the casing B and pressed into the thermoplastic resin for fixing thereto. Accordingly, the polarizing film 2 can be laminated flatly so as to conform to the surface of the casing without creasing over the region where the decorative effect of the polarizing film 2 is needed, and the edge portion of the polarizing film can be secured to the portion where no decoration is needed. As a result, if jagged edges occur, such jagged edges are not visible from the outside, and do not affect the appearance of the casing.

In the specific example shown in FIG. 8, the bending portion is fixedly secured to the underside of the edge portion of the casing B, but the bending portion may be further extended so as to be bent behind the edge portion of the casing B, and may be fixedly secured behind the edge portion. Further, the film may be fused by heat generated by the pressing jig 11, or the pressing jig 11 may be used as a cutting jig and pressed against the polarizing film 2 to cut off the excess portion thereof, while processing the film for fixing.

Third Embodiment

The thermoplastic resin casing fabrication methods according to the first and second embodiments described above have concerned the case where the thermoplastic resin casing is fabricated through two separate processes, that is, after completing the molding by simultaneously forming the polarizing film and the thermoplastic resin in the resin molding process P1, the molding is transferred to the trimming process P2 in which the excess portion of the polarizing film is cut off and the edge portion of the film is processed for fixing. In the thermoplastic resin casing fabrication method according to the third embodiment hereinafter described, the resin molding process P1 and the trimming process P2 are performed as a continuous process so that the polarizing film is processed for fixing at an intermediate step in the thermoplastic resin molding process.

Figure 10A:
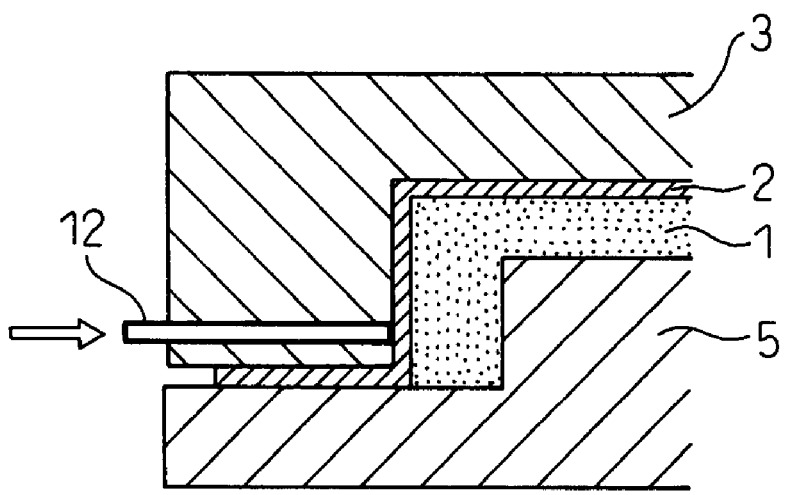
FIGS. 10A and 10B are cross-sectional views explaining a polarizing film fixing process in a thermoplastic resin casing fabrication method according to a specific example of a third embodiment.
Figure 11:
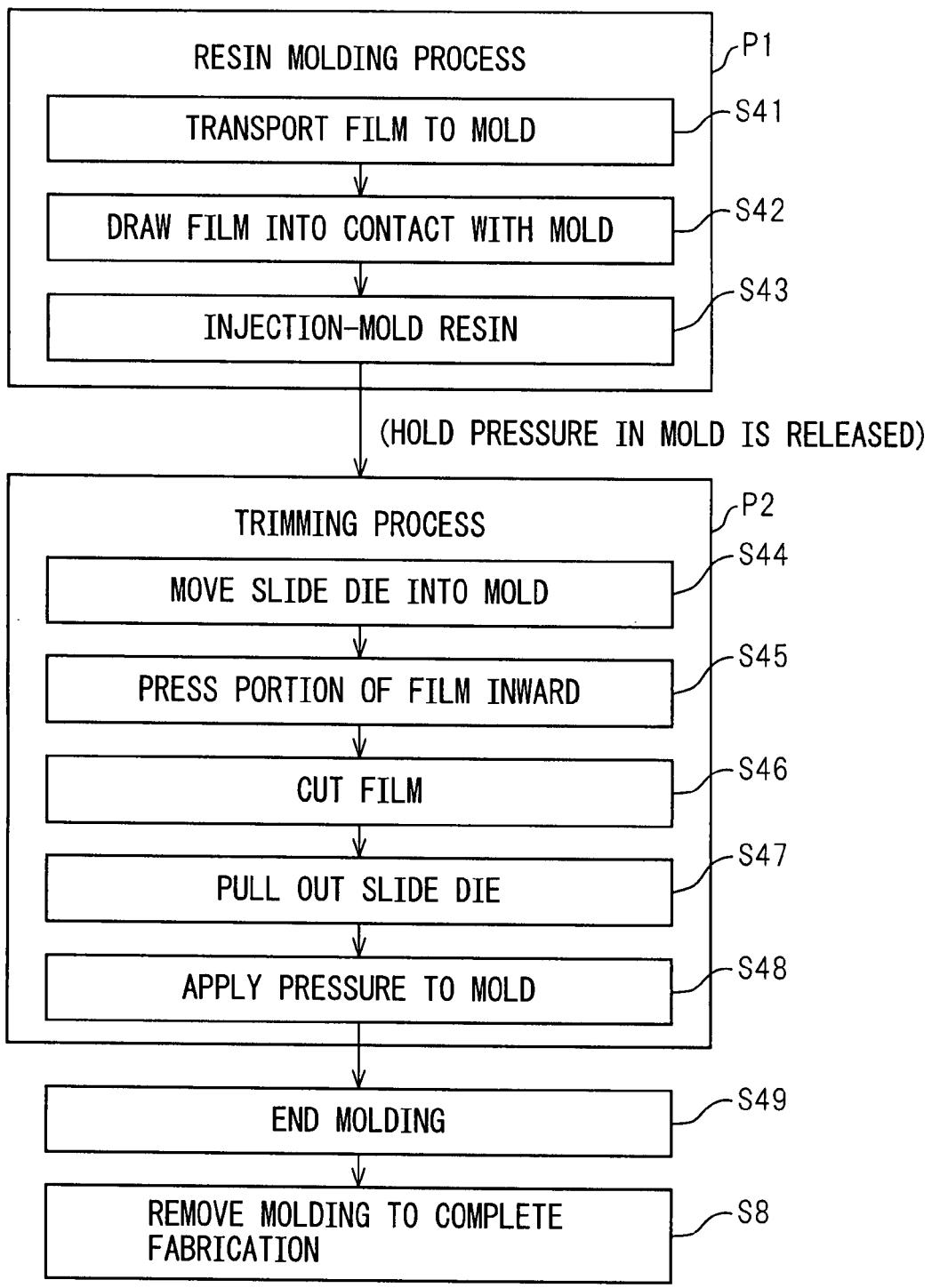
FIG. 11 is a flowchart explaining the sequence of processing steps in the fabrication method according to the specific example of the third embodiment.

FIG. 10A is a cross-sectional view showing a mold and an injection molding die used in one specific example of the thermoplastic resin casing fabrication method according to the third embodiment. FIG. 11 is a flowchart illustrating the sequence of processing steps in the thermoplastic resin casing fabrication method according to this specific example. For simplicity of illustration, the casing B shown in this example, unlike the casing B shown in FIG. 1, is a hollow cylinder having a rectangular cross section. The mold used in this fabrication method is similar in construction to the mold 3 shown in FIG. 2. In particular, in the fabrication method of the third embodiment, the mold 3 is provided with a slide die 12 insertable in the recessed portion which corresponds to the cylindrical portion of the casing B.

In the resin molding process P1, first the polarizing film 2 is transported and placed on the mold 3 having the recess of the prescribed shape (step S41). Next, by evacuating air from the recess through the evacuation hole 4, the polarizing film 2 is thermoformed into the prescribed shape conforming to the interior shape of the recess of the mold (step S42). At this time, the forward end of the slide die 12 provided in the mold 3 is held flush with the interior surface of the recess of the mold 3.

After forming the polarizing film 2 into the prescribed shape, the injection molding die 5 having a shape that matches the recessed shape of the mold 3 is placed onto the mold 3 by interposing therebetween the polarizing film 2 retained in the prescribed shape. Then, the thermoplastic resin is injected through the injection hole 6 provided in the injection molding die 5 (step S43).

After the injected thermoplastic resin has been formed into the prescribed shape in the recess of the mold 3, the injection molding hold pressure is temporarily released, and the process proceeds to the trimming process P2. Here, the slide die 12 provided in the mold 3 is moved into the recess by a prescribed length (step S44), thereby pressing the corresponding portion of the polarizing film 2 inwardly (step S45). At this time, the polarizing film 2 is cut to separate the excess film portion from the portion where the casing needs to be provided with decorative effects (step S46).

Next, after the slide die 12 is moved back to its original position or pulled out (step S47), pressure is again applied to the recess of the mold 3 (step S48). The thermoplastic resin molding process thus ends (step S49), and the molding is cooled and removed from the mold, completing the fabrication of the thermoplastic resin casing (step S8).

Figure 10B:
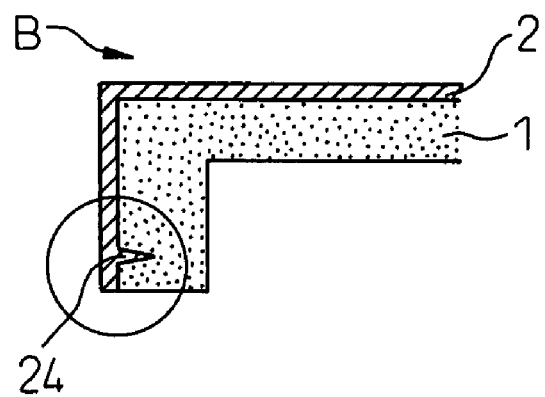

An enlarged cross-sectional view of the edge portion of the thus completed thermoplastic resin casing B is shown in FIG. 10B. As indicated at reference numeral 24 in FIG. 10B, a portion of the polarizing film 2 is processed for fixing to a side face of the cylindrical portion of the casing B. The details of the fixing process are shown in FIG. 12.

Figure 12A:
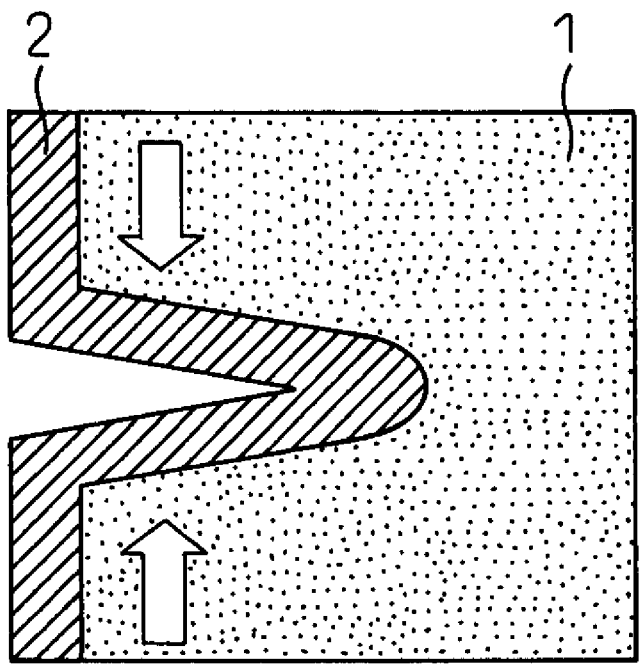
FIGS. 12A and 12B are diagrams explaining how the polarizing film fixing process is accomplished according to the third embodiment.
Figure 12B:
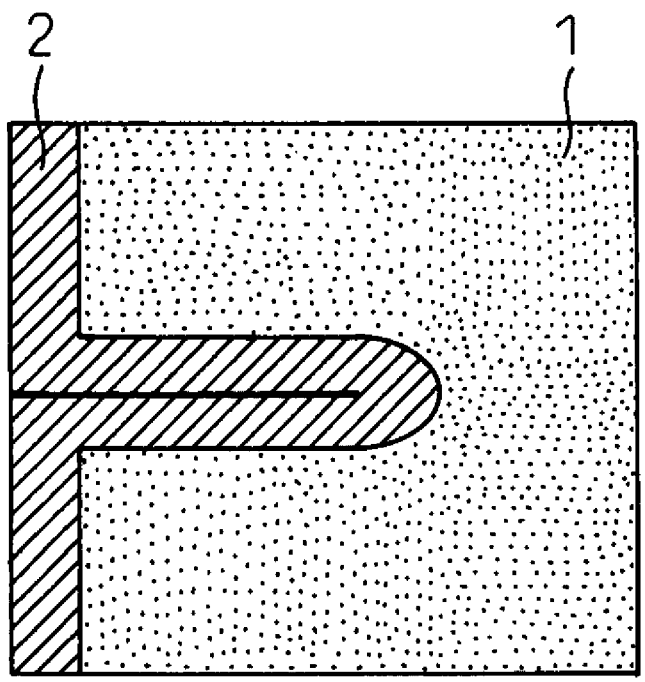

FIG. 12A shows the pressed condition of the polarizing film 2 when the slide die 12 is removed from the recess of the mold 3 in step S47 in the flowchart of FIG. 11. Here, a gap is left after the slide die 12 is removed. Next, when pressure is applied to the recess of the mold 3 in step S48, the gap is pressed together as shown by open arrows, and the gap is thus crushed under pressure as shown in FIG. 12B, making the pressed portions of the polarizing film 2 closely contact each other to accomplish the fixing process with a portion of the polarizing film 2 embedded in the thermoplastic resin, as indicated at reference numeral 25.

As described above, in the thermoplastic resin casing fabrication method according to the specific example of the third embodiment, a portion of the polarizing film 2 is pressed into the thermoplastic resin and fixed thereto during the thermoplastic resin molding process. In this process, by adjusting the pressing position, the polarizing film 2 can be laminated flatly so as to conform to the surface of the casing without creasing over the region where the decorative effect of the polarizing film 2 is needed, and the polarizing film applied to the portion where no decoration is needed can be removed as excess film. Furthermore, since the edge portion of the polarizing film 2 applied to the surface of the casing is embedded in the thermoplastic resin for fixing thereto, the formation of jagged edges can be prevented, and the appearance of the casing can thus be enhanced.

Figure 13:
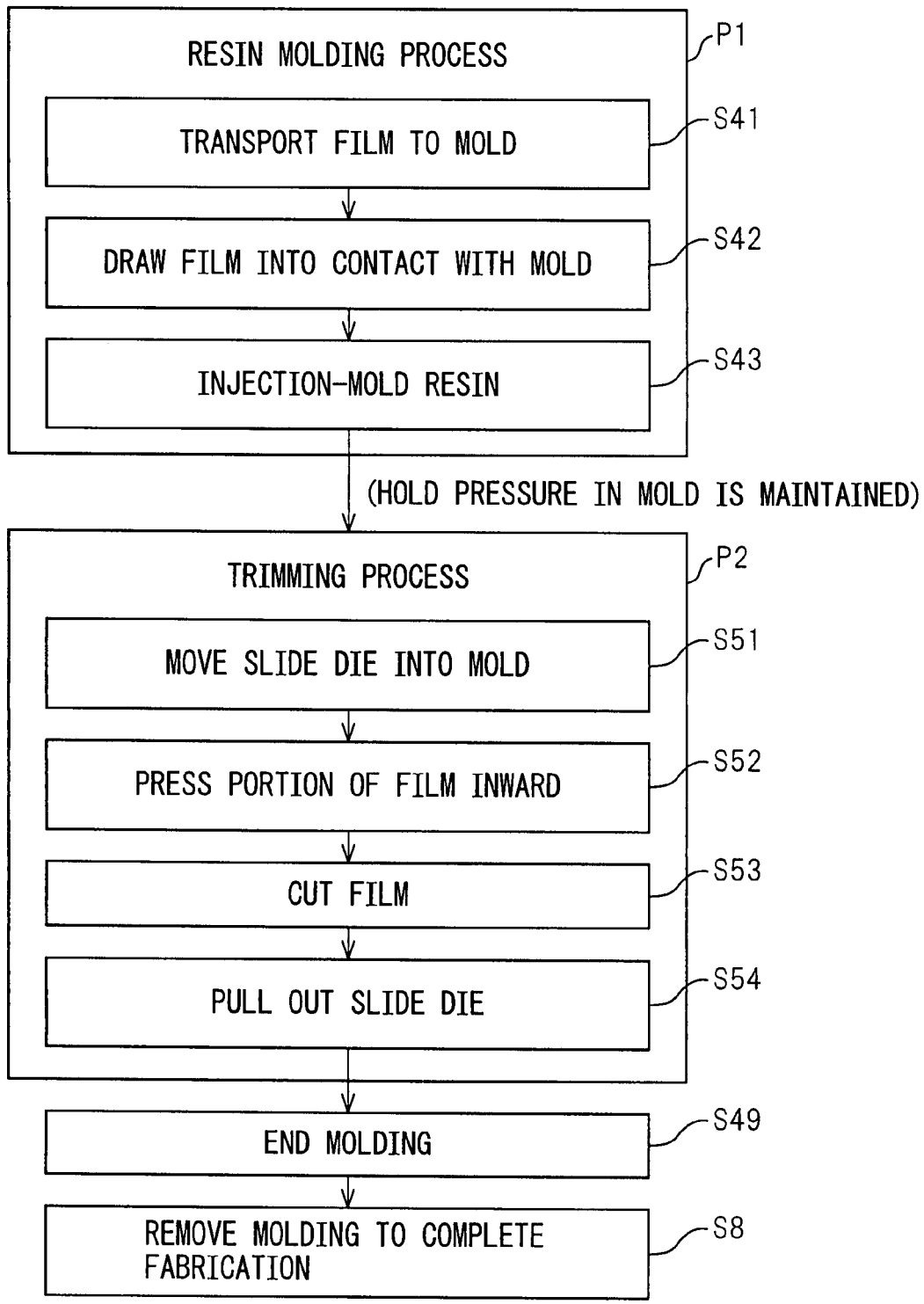
FIG. 13 is a flowchart explaining the sequence of processing steps in a fabrication method according to a modified example of the third embodiment.

In the thermoplastic resin casing fabrication method according to the specific example of the third embodiment described above, the hold pressure within the recess of the mold is temporarily released after the thermoplastic resin is injection-molded, and in this condition, the slide die is pushed in and then pulled out, after which the pressure is again applied to the recess thereby processing the portion of the polarizing film for fixing. In a modified example of the thermoplastic resin casing fabrication method according to the third embodiment, the fixing process is performed by interchanging some of the processing steps, the processing sequence of which is shown in FIG. 13 in flowchart form.

The resin molding process P1 is essentially the same as that of the specific example shown in the flowchart of FIG. 11, but in the process shown in the flowchart of FIG. 11, after the injected thermoplastic resin has been molded into the prescribed shape in the recess of the mold 3 in step S43, the injection molding hold pressure is temporarily released, and then the process proceeds to the trimming process P2. On the other hand, in the fabrication method according to the modified example shown in FIG. 13, the process proceeds to the trimming process P2 while maintaining the injection molding hold pressure.

Here, while maintaining the hold pressure in the mold, the slide die 12 provided in the mold 3 is moved into the recess by a prescribed length (step S51), thereby pressing the corresponding portion of the polarizing film 2 inwardly (step S52). At this time, the polarizing film 2 is cut to separate the excess film portion from the portion where the casing needs to be provided with decorative effects (step S53).

Next, the slide die 12 is moved back to its original position or pulled out (step S54), thus ending the thermoplastic resin molding process (step S49). Then, the molding is cooled and removed from the mold, completing the fabrication of the thermoplastic resin casing (step S8). The fixing process of the polarizing film 2 on the thermoplastic resin casing B completed here is essentially the same as that shown in the specific example of the third embodiment, but in the modified example, the processing of the portion of the polarizing film for fixing, such as shown in FIG. 12B, is accomplished when the slide die 12 is pulled out in step S54.

As described above, in the thermoplastic resin casing fabrication method according to the modified example of the third embodiment, since a portion of the polarizing film 2 is pressed into the thermoplastic resin and fixed thereto during the thermoplastic resin forming process, as in the specific example of the third embodiment, the polarizing film 2 can be laminated flatly so as to conform to the surface of the casing without creasing over the region where the decorative effect of the polarizing film 2 is needed, and the appearance of the casing can be enhanced by preventing the formation of jagged edges at the edge portion of the polarizing film 2 laminated to the surface of the casing.

Fourth Embodiment

As described above, in the thermoplastic resin casing fabrication methods according to the first to third embodiments, after completing the molding by simultaneously forming the polarizing film and the thermoplastic resin in the resin molding process P1, only the excess portion of the polarizing film is cut off and the edge portion of the film is processed for fixing in the trimming process P2, thereby completing the fabrication of the casing B.

However, when the casing as a finished product is used not by itself, but as part of some other apparatus, the casing may be provided with a mounting base. In such cases, if the mounting base is hidden within the apparatus, at least the main surface of the casing need only be neatly decorated. In view of this, in the thermoplastic resin casing fabrication method according to the fourth embodiment, which concerns the fabrication of such a casing, the thermoplastic resin is injection-molded in the molding process P1 to produce a molding containing a gate portion connecting to the outer periphery of the mounting base, and then in the trimming process P2, the excess film of the polarizing film formed over the entire surface is cut off together with the gate portion. If film delamination or jagged edges occur on the mounting base of the casing, such imperfections will not present any problems in terms of decoration, as long as there are no anomalies in the polarizing film on the main surface of the casing.

Figure 14A:
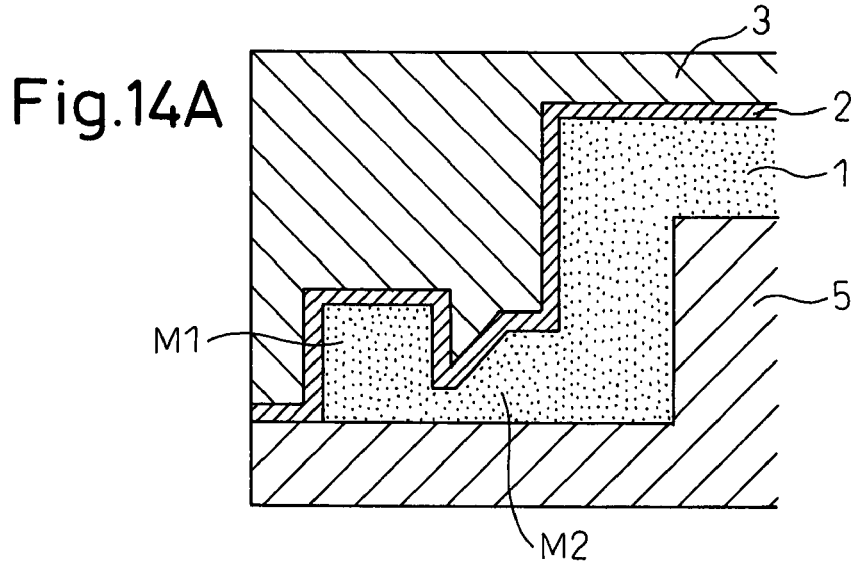
FIGS. 14A to 14C are cross-sectional views explaining processing steps in a thermoplastic resin casing fabrication method according to a specific example of a fourth embodiment.
Figure 15:
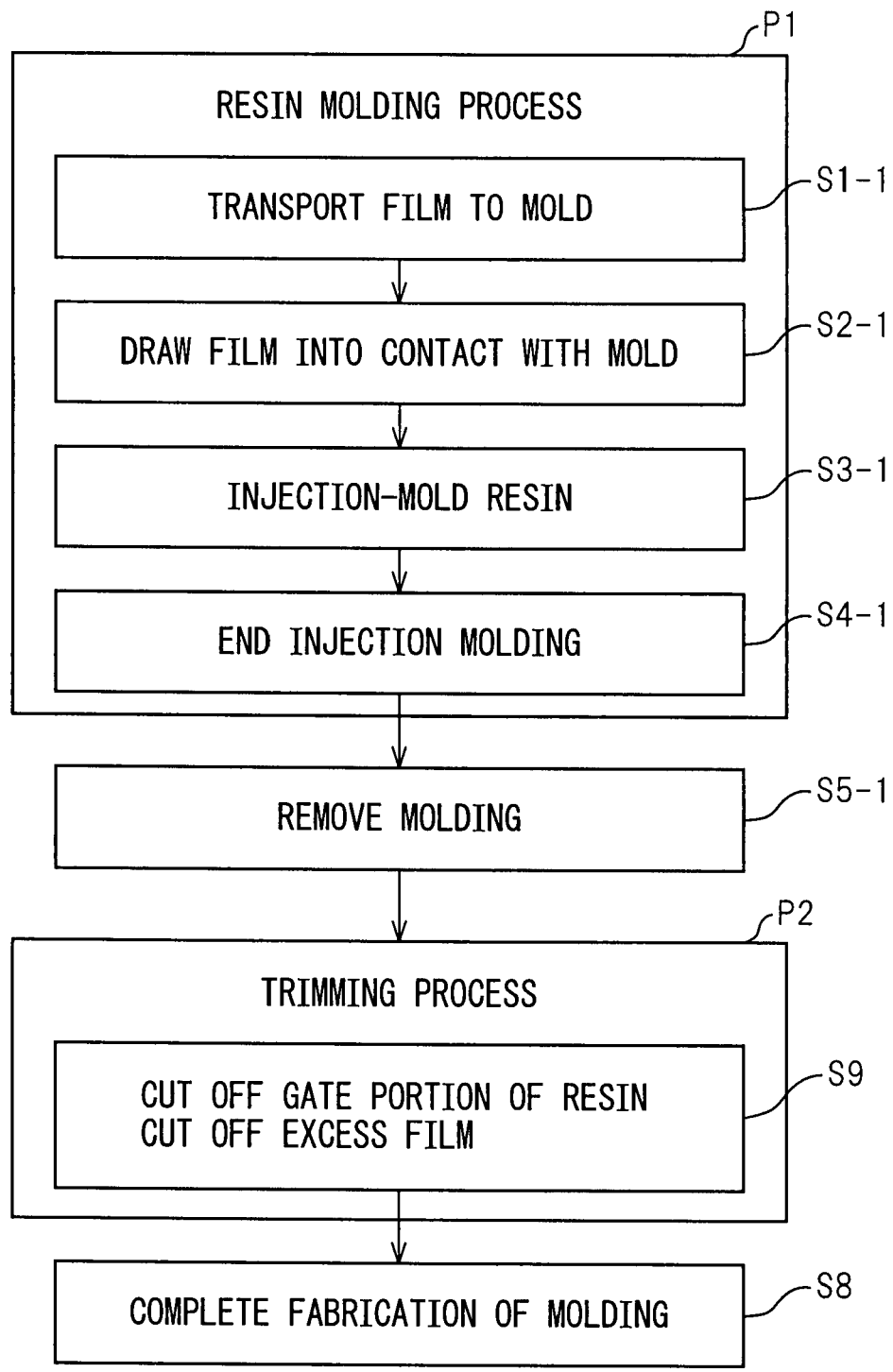
FIG. 15 is a flowchart explaining the sequence of processing steps in the fabrication method according to the specific example of the fourth embodiment.

FIG. 14A is a cross-sectional view showing a mold and an injection molding die used in one specific example of the thermoplastic resin casing fabrication method according to the fourth embodiment. FIG. 15 is a flowchart illustrating the thermoplastic resin casing fabrication method according to this specific example. For simplicity of illustration, the casing B shown in this example, unlike the casing B shown in FIG. 1, is a hollow cylinder having a rectangular cross section. The mold used in this fabrication method is similar in construction to the mold 3 shown in FIG. 2. In particular, the mold 3 used in the specific example of the fabrication method of the fourth embodiment has a mounting base forming recess M2 around the periphery of the recess corresponding to the cylindrical portion of the casing B and a waste forming recess M1 around the periphery of the recess M2.

The resin molding process P1 in the thermoplastic resin casing fabrication method according to the fourth embodiment is essentially the same as the resin molding process P1 in the thermoplastic resin casing fabrication method shown in FIG. 3, but the difference is that, in the fourth embodiment, the polarizing film 2 is placed over the mounting base forming recess M2 and the waste forming recess M1, as well as the recess of the prescribed shape provided in the mold 3.

First, the polarizing film 2 is transported and placed on the mold 3 having the recess of the prescribed shape, the mounting base forming recess M2, and the waste forming recess M1 (step S1-1). Next, by evacuating air from the recess through the evacuation hole 4, the polarizing film 2 is thermoformed into the prescribed shape conforming to the interior shape of the recess of the mold (step S2-1). At this time, the mounting base forming recess M2 and the waste forming recess M1 are also evacuated, drawing the polarizing film into the respective recesses, though not completely.

After forming the polarizing film 2 into the prescribed shape, the injection molding die 5 having a shape that matches the recessed shape of the mold 3 is placed onto the mold 3 by interposing therebetween the polarizing film 2 retained in the prescribed shape. Then, the thermoplastic resin is injected through the injection hole 6 provided in the injection molding die 5 (step S3-1).

Figure 14B:
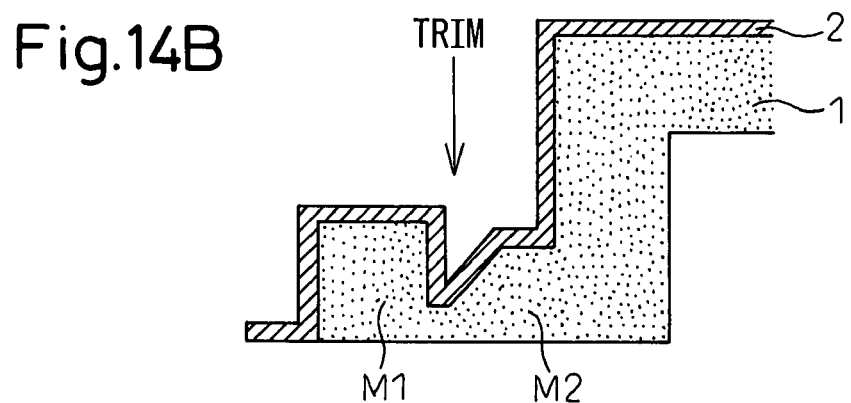

The injected thermoplastic resin is formed into the prescribed shape in the recess of the mold 3, and the thermoplastic resin is also formed in the mounting base forming recess M2 and the waste forming recess M1 in a continuous fashion with the above recess (step S4-1). Then, the injection molding die 5 is withdrawn and the molding is removed from the mold 3 (step S5). In this way, the thermoplastic resin is formed into the prescribed shape only on the interior side of the polarizing film 2 in such a manner as to conform to the interior surface of the polarizing film 2 formed and retained in the prescribed shape extending over the mounting base forming recess M2 and the waste forming recess M1, as shown in FIG. 14B.

After the injected thermoplastic resin has been formed into the prescribed shape in the mold 3, the process proceeds to the trimming process P2. Here, the molding is placed on a cutting die base such as shown in FIG. 8A, and the polarizing film 2 is trimmed by cutting it along the boundary between the mounting base forming recess M2 and the waste forming recess M1 by means of a cutting die, as shown in FIG. 14B (step S9). The waste forming recess M1 together with the polarizing film 2 is separated from the mounting base forming recess M1 along the boundary, to complete the fabrication of the thermoplastic resin casing B (step S8).

Figure 14C:
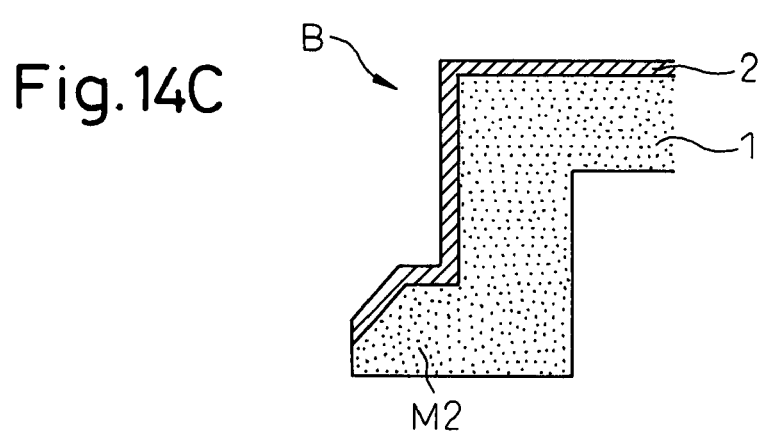

An enlarged cross-sectional view of the edge portion of the thus completed thermoplastic resin casing B is shown in FIG. 14C. As shown in FIG. 14C, the trimmed edge portion of the polarizing film 2 is formed at the edge of the mounting base M2. However, if jagged edges are formed at the edge portion of the polarizing film 2 when cut off, or if the film partially delaminates when the product is subsequently assembled, since the mounting base M2 of the casing B is hidden from view when mounted on an apparatus or the like, the edge portion of the polarizing film 2 need only be fixed to the thermoplastic resin forming the mounting base M2, and any anomalies at the edge portion will not affect the decorativeness or appearance of the thermoplastic resin casing B.

Fifth Embodiment

In the thermoplastic resin casing fabrication method according to the fourth embodiment described above, the edge portion of the polarizing film has been processed for fixing to the mounting base portion protruding outward from the edge of the casing. On the other hand, in the thermoplastic resin casing fabrication method according to the fifth embodiment hereinafter described, the mounting portion of the casing is provided in the form of a step recessed inward of the outer circumferential face of the casing, and the edge portion of the polarizing film is processed for fixing to this mounting portion.

Figure 16A:
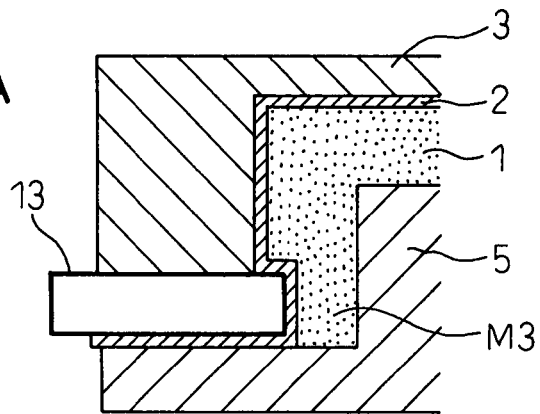
FIGS. 16A to 16D are cross-sectional views explaining processing steps in a thermoplastic resin casing fabrication method according to a specific example of a fifth embodiment.
Figure 17:
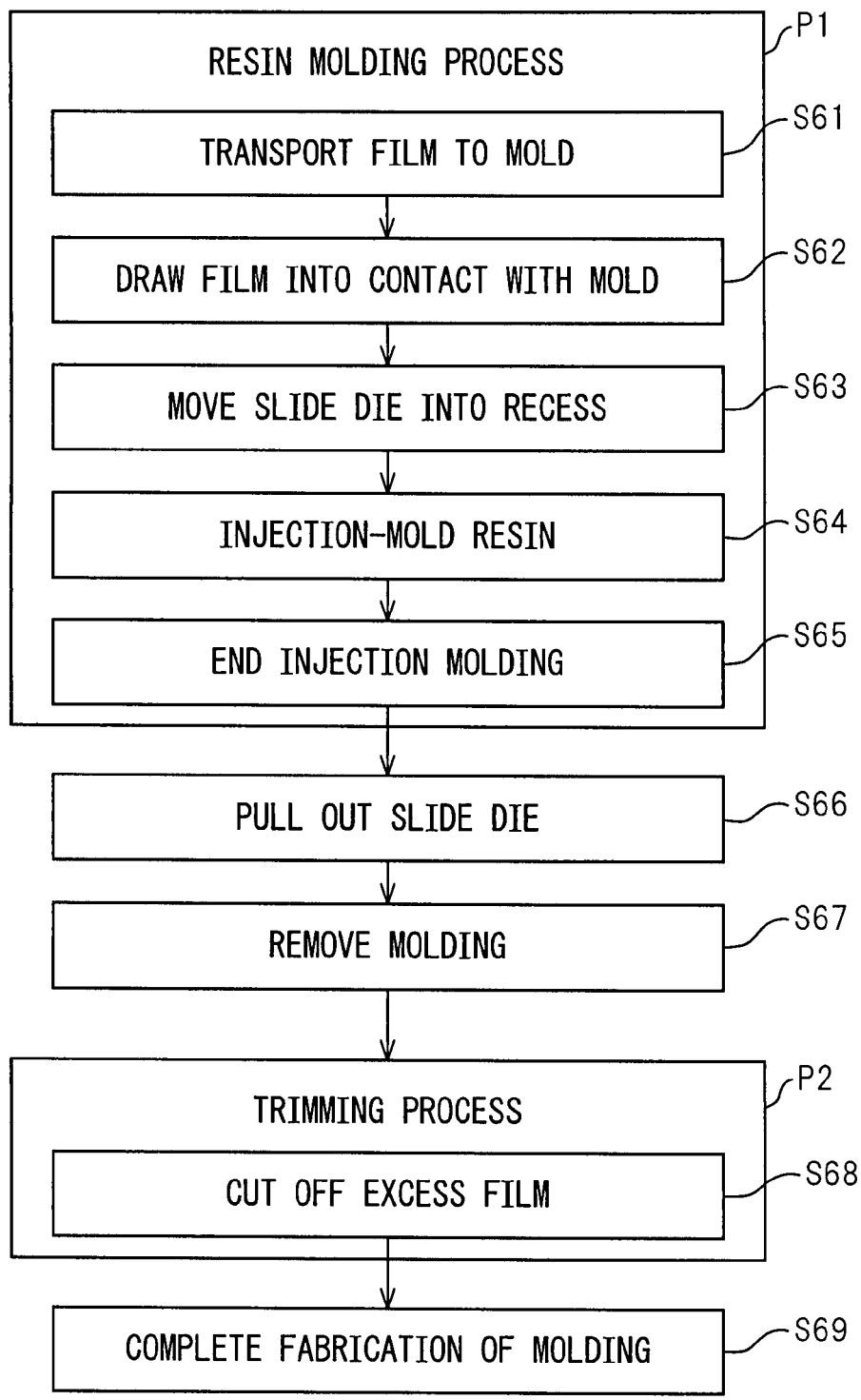
FIG. 17 is a flowchart explaining the sequence of processing steps in the fabrication method according to the specific example of the fifth embodiment.

FIG. 16A is a cross-sectional view showing a mold and an injection molding die used in one specific example of the thermoplastic resin casing fabrication method according to the fifth embodiment. FIG. 17 is a flowchart illustrating the sequence of processing steps in the thermoplastic resin casing fabrication method according to this specific example. For simplicity of illustration, the casing B shown in this example, unlike the casing B shown in FIG. 1, is a hollow cylinder having a rectangular cross section. The mold used in this fabrication process is similar in construction to the mold 3 shown in FIG. 2. In particular, in the fabrication method of the fifth embodiment, the mold 3 is provided with a slide die 13 insertable in the lower end portion which corresponds to the cylindrical portion of the casing B.

The mold 3 used in the fabrication method of the third embodiment has been provided with a thin slide die 12 insertable in the recess at a position corresponding to the outer cylindrical face of the casing B, but in the specific example of the fabrication method according to the fifth embodiment, the slide die 13 having a thickness corresponding to the mounting depth of the casing B is provided at the lower end of the recess of the mold 3 used to form the casing B. The thickness of the slide 13 corresponds to the length of the mounting portion M3 of the casing B, and the amount by which the forward end of the slide die 13 projects into the recess of the mold 3 defines the step formed in the edge portion of the casing B.

In the resin molding process P1, first the polarizing film 2 is transported and placed on the mold 3 having the recess of the prescribed shape (step S61). Next, by evacuating air from the recess through the evacuation hole 4, the polarizing film 2 is thermoformed into the prescribed shape conforming to the interior shape of the recess of the mold (step S62). Up to this time, the forward end of the slide die 13 provided in the mold 3 is held flush with the interior surface of the recess of the mold 3.

Next, with the polarizing film 2 thus drawn into the recess of the mold 3, the slide die 13 is moved into the recess until its forward end protrudes by an amount equal to the depth of the step of the mounting portion M3 (step S63). Then, while retaining the shape of the polarizing film 2 with a portion thereof formed inwardly of the recess, the injection molding die 5 having a shape that matches the recessed shape of the mold 3 is placed onto the mold 3 by interposing the polarizing film 2 therebetween. Then, as shown in FIG. 16A, the thermoplastic resin is injected through the injection hole 6 provided in the injection molding die 5 (step S64). The injection molding thus ends, and the molding is cooled (step S65).

Figure 16B:
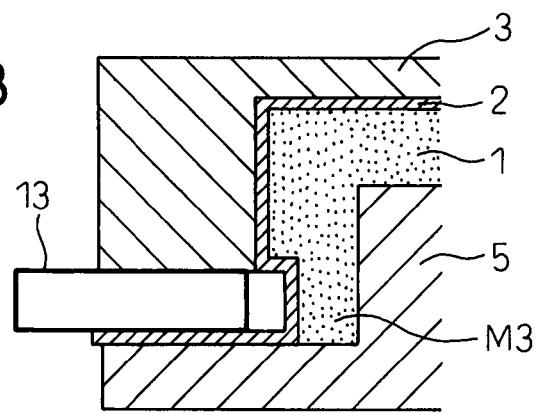
Figure 16C:
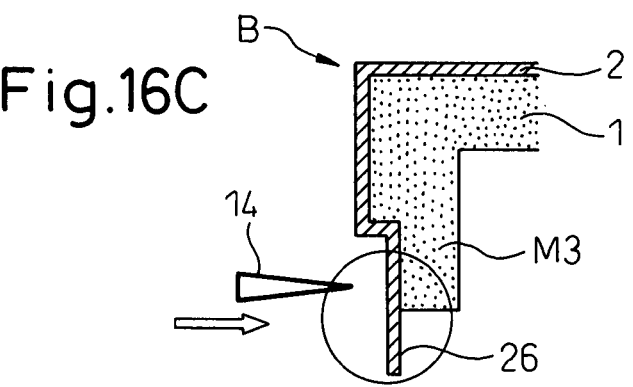

When the thermoplastic resin is cooled to the point where the molding can be retained in the prescribed shape in the recess of the mold 3, the slide die 13 provided in the mold 3 is moved back as shown in FIG. 16B by the same amount by which it was moved to project inward (step S66). Then, the molding is removed from the mold (step S67). A cross-sectional view of the edge portion of the thus removed molding is shown in FIG. 16C. In particular, as shown by a circle, the excess portion 26 of the polarizing film 2 extends beyond the lower end of the mounting portion of the casing B.

Figure 16D:
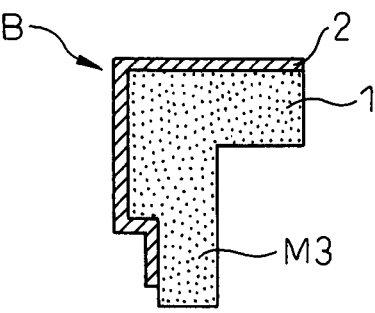

After the molding formed from the thermoplastic resin is removed from the mold 3, the process proceeds to the trimming process P2. Here, the laminated polarizing film 2 is cut off by a cutter 14 placed at a suitable position on the side face of the mounting portion M3 of the casing B, as shown in FIG. 16C (step S68). The polarizing film 2 thus cut terminates at the side face of the mounting portion M3 of the casing B, and the edge portion of the polarizing film 2 is made to adhere somewhere within the bounds of the mounting portion M3 of the casing B. The finished condition is shown in FIG. 16D.

In step S68, the pressing jig 11 used in the specific example of the second embodiment may be used instead of the cutter 14. In that case, the excess portion 26 of the polarizing film 2 is not only cut off, but the edge portion of the laminated polarizing film 2 is fused for fixing to the thermoplastic resin.

In the specific example of the thermoplastic resin casing fabrication method according to the fifth embodiment, the polarizing film 2 is laminated extending up to the mounting portion M3 of the casing B, and the edge portion of the polarizing film 2 is formed along the mounting portion; therefore, if film delamination or jagged edges occur at the mounting portion of the casing B, these imperfections do not affect the external appearance since they are hidden from view when the casing is mounted and since the polarizing film remains laminated neatly without creasing on the main surface of the casing.

In the specific example of the fabrication method according to the fifth embodiment, when the casing B is mounted on an apparatus, the mounting portion is invisible from the outside, and only the main surface of the casing B is visible from the outside. However, depending on the application, the mounting face may be formed on the interior side of the edge portion of the casing B, and the entire exterior surface of the casing B may be visible even when the casing B is mounted on an apparatus.

As a modified example of the thermoplastic resin casing fabrication method according to the fifth embodiment, FIG. 18 shows how the edge portion of the polarizing film 2 is processed for fixing when the mounting face is formed on the interior side of the edge portion of the casing B. The fabrication process is essentially the same as that shown in the flowchart of FIG. 17, but the difference is that the injection molding die 5 not only has a shape that matches the recessed shape of the mold 3, as shown in FIG. 16A, but also has a stepped portion that matches the mounting face to be formed on the interior side of the edge portion of the casing B.

Figure 18A:
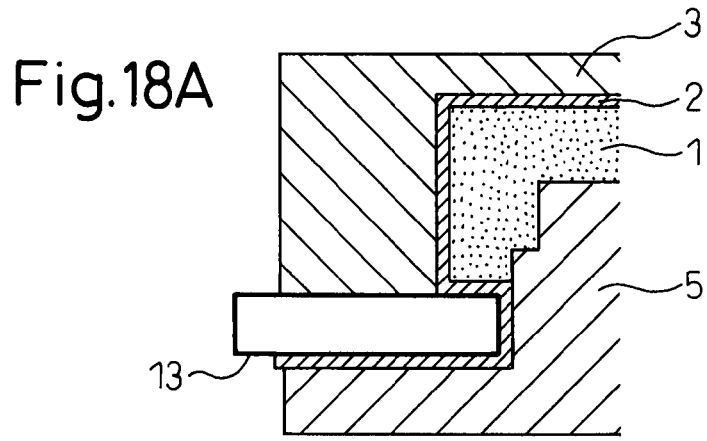
FIGS. 18A to 18D are cross-sectional views explaining processing steps in a thermoplastic resin casing fabrication method according to a modified example of the fifth embodiment.

In the modified example of the fabrication method according to the fifth embodiment, in step S63 in the flowchart of FIG. 17 the slide die 13 is moved until it comes into contact, via the polarizing film 2, with the outer face of the stepped portion formed on the injection molding die 5, and thereafter, the thermoplastic resin is injection-molded as shown in FIG. 18A, to complete the resin molding process P1.

Figure 18B:
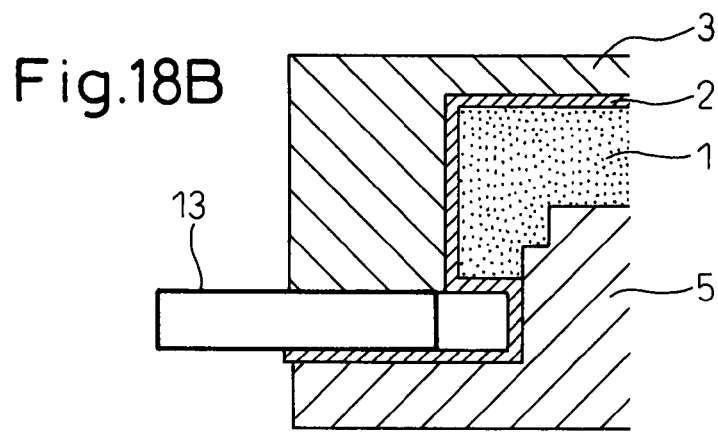
Figure 18C:
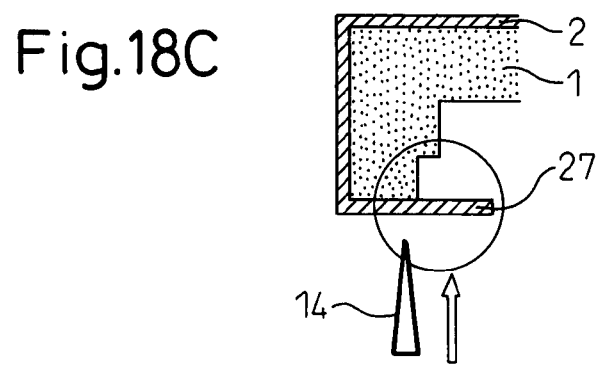

Then, in step S66, the slide die 13 is withdrawn from the recess of the mold 3 as shown in FIG. 18B, and in step S67, the molding is removed from the mold. A cross-sectional view of a portion of the thus removed molding is shown in FIG. 18C, and the excess portion 27 of the polarizing film 2 is shown enclosed by a circle. The excess portion 27 is bonded along the lower end face of the edge portion of the casing B, and extends inwardly of the casing B.

Figure 18D:
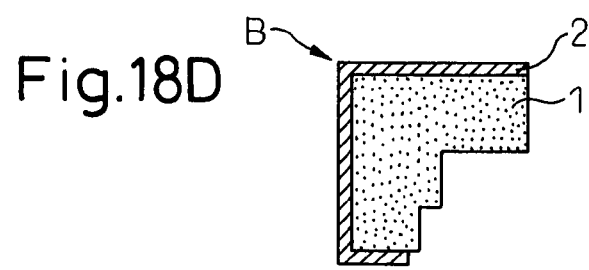

Next, the process proceeds to the trimming process P2 to remove the excess portion 27. In step S68, the laminated polarizing film 2 is cut off by the cutter 14 placed at a suitable position on the lower end face of the edge portion of the casing B, as shown in FIG. 18C. The polarizing film 2 thus cut terminates at the lower end face of the edge portion of the casing B, and the edge portion of the polarizing film 2 is made to adhere somewhere within the bounds of the lower end face of the edge portion of the casing B. The finished condition is shown in FIG. 18D.

In the modified example of the fabrication method according to the fifth embodiment, the pressing jig 11 used in the specific example of the fabrication method according to the second embodiment may be used instead of the cutter 14, as in the specific example of the fabrication method according to the fifth embodiment described above.

In the modified example of the thermoplastic resin casing fabrication method according to the fifth embodiment, the mounting face is formed on the interior surface of the edge portion of the casing B, and the polarizing film 2 is laminated extending up to the lower end face of the edge portion of the casing B, the edge portion of the polarizing film 2 being formed along the lower end face. Therefore, if film delamination or jagged edges occur on the lower end face of the edge portion of the casing B, these imperfections do not affect the external appearance of the casing since they are not easily visible from the outside when the casing is mounted and since the polarizing film remains laminated neatly without creasing on the main surface of the casing.

Sixth Embodiment

In the specific example of the thermoplastic resin casing fabrication method according to the fifth embodiment described above, the edge portion of the polarizing film 2 has been formed or processed for fixing somewhere within the mounting portion M3 of the casing B, as previously shown in FIG. 16. One specific example of the thermoplastic resin casing fabrication method according to the sixth embodiment hereinafter described also concerns the fabrication of a casing B having a mounting portion M3 similar to the one shown in FIG. 16, but in the fabrication process of this specific example, the polarizing film is preformed in an optimum shape for applying decoration to the casing B so that the edge portion of the polarizing film 2 can be processed for fixing without using a special jig or tool, and the trimming process is performed during the resin molding process.

Figure 19A:
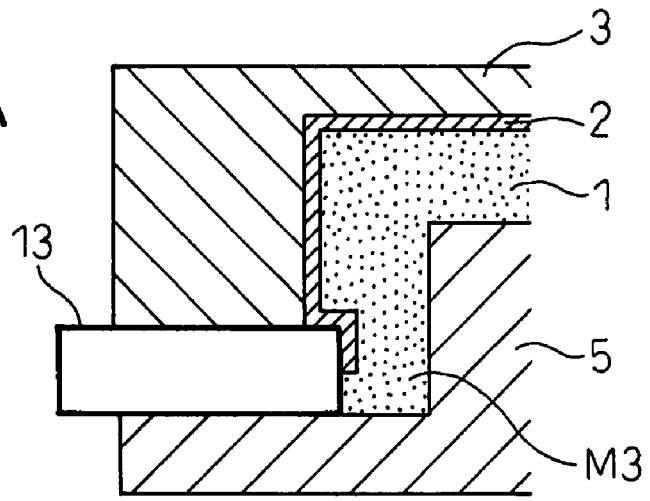
FIGS. 19A to 19C are cross-sectional views explaining the sequence of processing steps in a thermoplastic resin casing fabrication method according to a specific example of a sixth embodiment.
Figure 20:
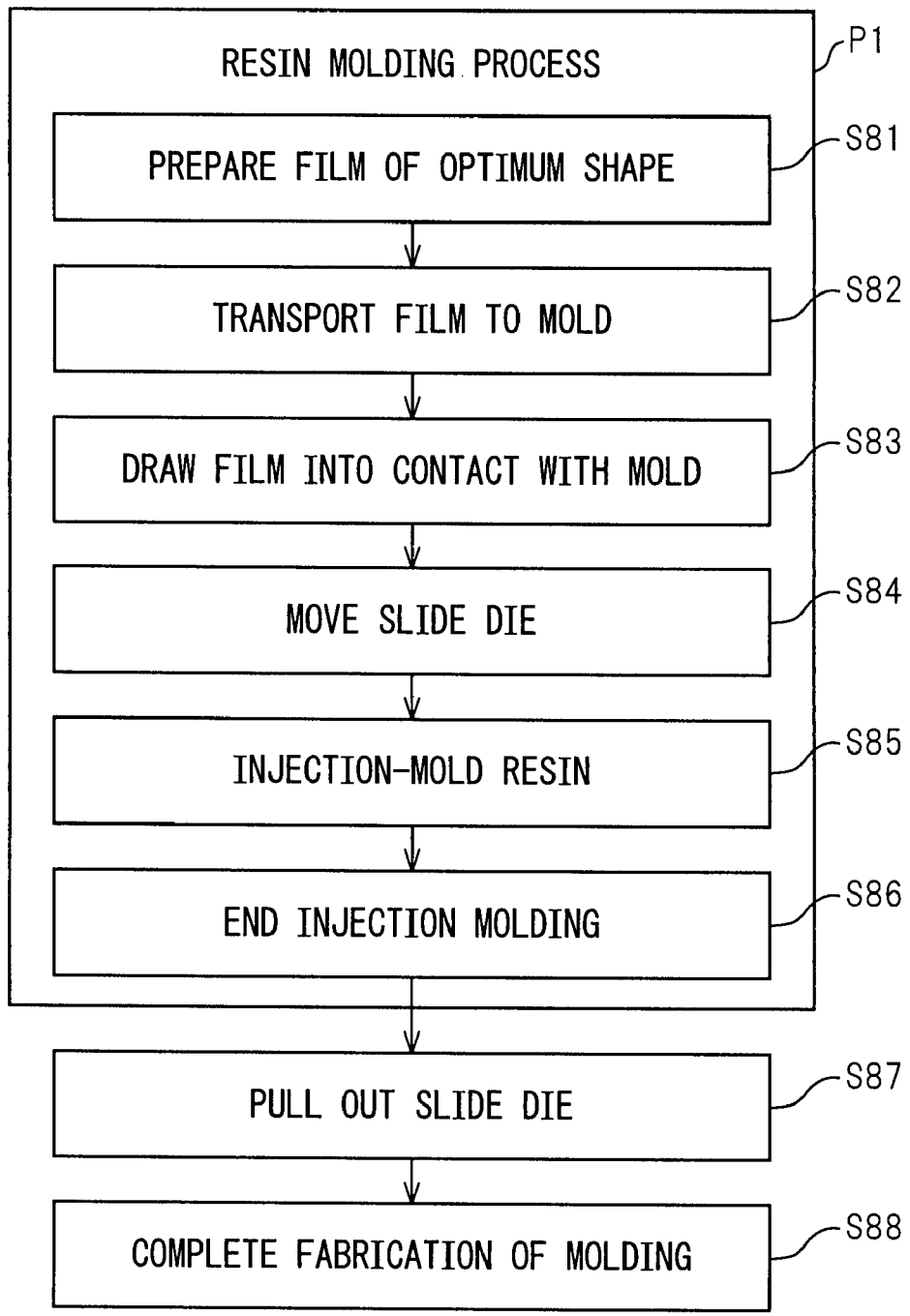
FIG. 20 is a flowchart explaining the sequence of processing steps in the fabrication method according to the specific example of the sixth embodiment.

FIG. 19A is a cross-sectional view showing a mold and an injection molding die used in the specific example of the thermoplastic resin casing fabrication method according to the sixth embodiment. FIG. 20 is a flowchart illustrating the process for fabricating the thermoplastic resin casing according to this specific example. For simplicity of illustration, the casing B shown in this example, unlike the casing B shown in FIG. 1, is a hollow cylinder having a rectangular cross section, in common with the other specific examples. The mold used in this fabrication process is similar in construction to the mold 3 shown in FIG. 2. In particular, in the fabrication method of the sixth embodiment, the mold 3 is provided with a slide die 13 insertable in the lower end portion which corresponds to the cylindrical portion of the casing B.

In the mold 3 used in the specific example of the sixth embodiment, as in the specific example of the fifth embodiment, the slide die 13 having a thickness corresponding to the mounting depth of the casing B is provided at the lower end of the recess of the mold 3 used to form the casing B. The thickness of the slide 13 corresponds to the length of the mounting portion M3 of the casing B, and the amount by which the forward end of the slide die 13 projects into the recess of the mold 3 defines the step formed in the edge portion of the casing B.

According to the flowchart shown in FIG. 20, in the resin molding process P1, first the polarizing film 2 is formed in an optimum shape that matches the region where decoration is to be applied to the casing B (step S81). The optimum shape here refers to a shape so adjusted that when the polarizing film 2 is drawn into the recess of the mold 3, the edge portion of the film is located within the bounds of the side face of the mounting portion M3 of the casing B.

The polarizing film 2 thus formed in the optimum shape is transported and placed on the mold 3 having the recess of the prescribed shape (step S82). Next, by evacuating air from the recess through the evacuation hole 4, the polarizing film 2 is thermoformed into the prescribed shape conforming to the interior shape of the recess of the mold (step S83). Up to this time, the forward end of the slide die 13 provided in the mold 3 is held flush with the interior surface of the recess of the mold 3.

Next, with the polarizing film 2 thus drawn into the recess of the mold 3, the slide die 13 is moved into the recess until its forward end protrudes by an amount equal to the depth of the step of the mounting portion M3 (step S84). Then, while holding the polarizing film 2 drawn conforming to the shape of the recess, the injection molding die 5 having a shape that matches the recessed shape of the mold 3 is placed onto the mold 3 by interposing the polarizing film 2 therebetween. Then, as shown in FIG. 19A, the thermoplastic resin is injected through the injection hole 6 provided in the injection molding die 5 (step S85). The injection molding thus ends, and the molding is cooled (step S86).

Figure 19B:
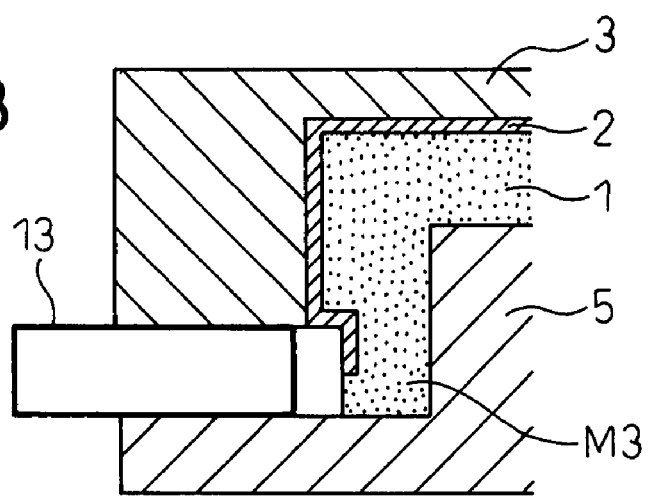
Figure 19C:
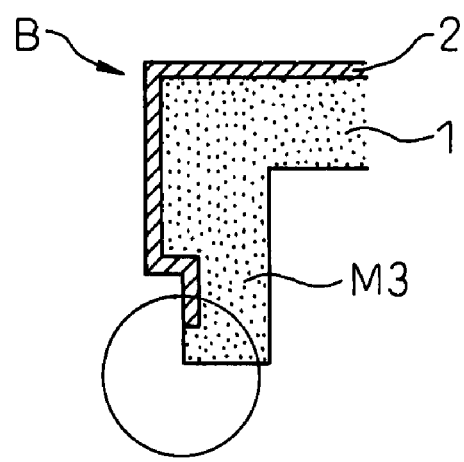

When the thermoplastic resin is cooled to the point where the molding can be retained in the prescribed shape in the recess of the mold 3, the slide die 13 provided in the mold 3 is moved back as shown in FIG. 19B by the same amount by which it was moved to project inward (step S87). Then, the molding is removed from the mold to complete the fabrication of the molding (step S88). A cross-sectional view of an edge portion of the thus completed molding is shown in FIG. 19C. As shown by a circle, the edge portion of the polarizing film 2 is held fixed to the outer circumferential face of the mounting portion M3 of the casing B by being embedded into the thermoplastic resin for adhesion during the injection molding.

In the specific example of the thermoplastic resin casing fabrication method according to the sixth embodiment, since the polarizing film is preformed in the optimum shape for applying decoration to the casing B, and the edge portion of the polarizing film 2 is processed for fixing during the injection molding process, the trimming process can be omitted, and the fabrication process can be simplified accordingly. Furthermore, the polarizing film 2 is laminated extending up to the mounting portion M3 of the casing B, and the edge portion of the polarizing film 2 is formed along the mounting portion. Therefore, if film delamination or jagged edges occur at the mounting portion of the casing B, these imperfections do not affect the external appearance since they are hidden from view when the casing is mounted and since the polarizing film remains laminated neatly without creasing on the main surface of the casing.

The technique employed in the specific example of the fabrication method according to the sixth embodiment, i.e., the technique in which the polarizing film is preformed in the optimum shape for applying decoration to the casing B and is fixedly secured to the thermoplastic resin simultaneously with the injection molding thereof, can also be applied to such cases as when decoration is partially applied to the main surface of the casing B or when decoration need not be applied to the edge portion of the casing B.

The casing B fabricated in the specific example of the fabrication method according to the sixth embodiment described above is provided with the mounting portion M3 around the edge of the casing B as shown in FIG. 19C, as in the earlier described fifth embodiment. Next, as a modified example of the fabrication method according to the sixth embodiment, a thermoplastic resin casing fabrication method that can be applied to the case where the mounting face is formed on the interior surface of the edge portion of the casing B, like the one previously shown in FIG. 18D, will be described with reference to FIG. 21.

In the modified example of the fabrication method according to the sixth embodiment, the fabrication process is essentially the same as that shown in the flowchart of FIG. 20, but the difference is that while, in the specific example of the sixth embodiment, the slide die 13 is moved in step S84 so as to project into the recess of the mold 3 by an amount equal to the depth of the step of the mounting portion M3, in the modified example of the sixth embodiment the slide die 13 is moved until its forward end strikes against the outer circumferential face of the protruding portion of the injection molding die 5. The other steps are the same as those in the specific example of the sixth embodiment, and the description of those steps will not be repeated here.

Figure 21A:
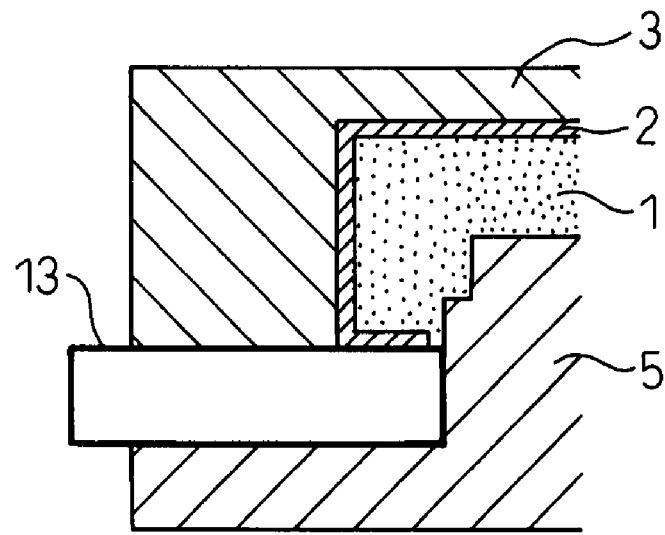
FIGS. 21A to 21C are cross-sectional views explaining processing steps in a thermoplastic resin casing fabrication method according to a modified example of the sixth embodiment.
Figure 21B:
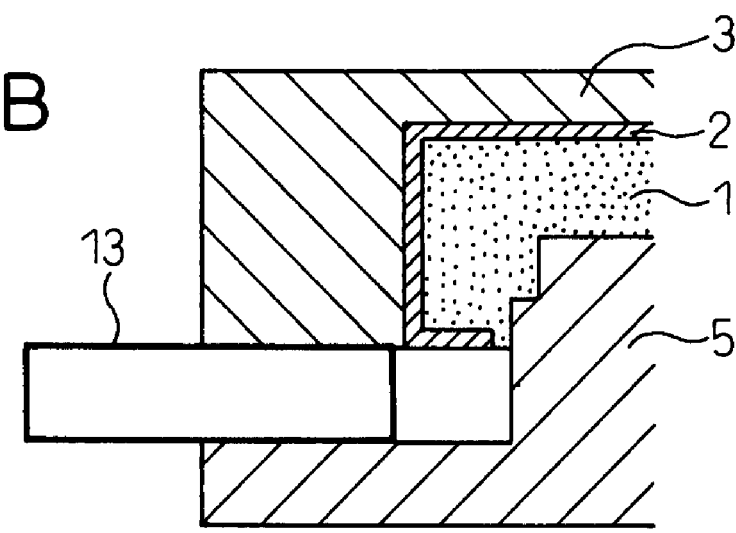
Figure 21C:
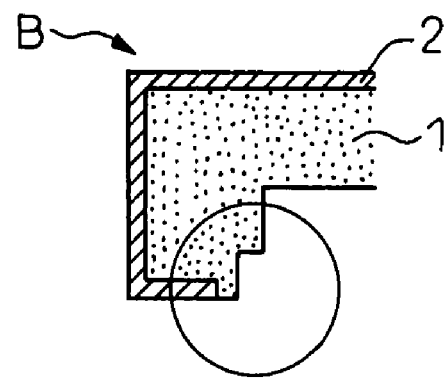

The process employed in the modified example of the fabrication method according to the sixth embodiment can also be applied to the case where the polarizing film is continuously formed, extending from the main surface of the casing B to the lower end face of the edge portion thereof where the edge portion of the polarizing film is processed for fixing, as in the case of the specific example of the fabrication method according to the second embodiment. In this case also, the slide die 13 insertable in the mold 3 has to be provided as shown in FIG. 21A, but the trimming process can be omitted to simplify the fabrication process.

Seventh Embodiment

The resin molding process P1 in the fabrication method according to each of the first to fifth embodiments so far described is based on the resin molding process P1 in the thermoplastic resin casing fabrication method shown in FIGS. 2 and 3. In this resin molding process P1, the polarizing film is not preformed in the optimum shape as shown in the sixth embodiment described above, but a polarizing film wound in a continuous roll is drawn out of the roll and placed on the mold 3, as shown in FIG. 2A, without cutting it or by cutting it to the prescribed work size.

As a result, after the thermoplastic resin is injection-molded in the resin molding process P1, the excess portion of the polarizing film remains on the molding, requiring the use of a cutter or a cutting jig for cutting off the excess portion in the trimming process P2. In view of this, in the fabrication method according to the seventh embodiment hereinafter described, to facilitate the removal of the excess portion of the polarizing film, the polarizing film wound in a roll is formed with perforations conforming to the optimum shape that matches the region where decoration is to be applied to the casing B.

Figure 22:
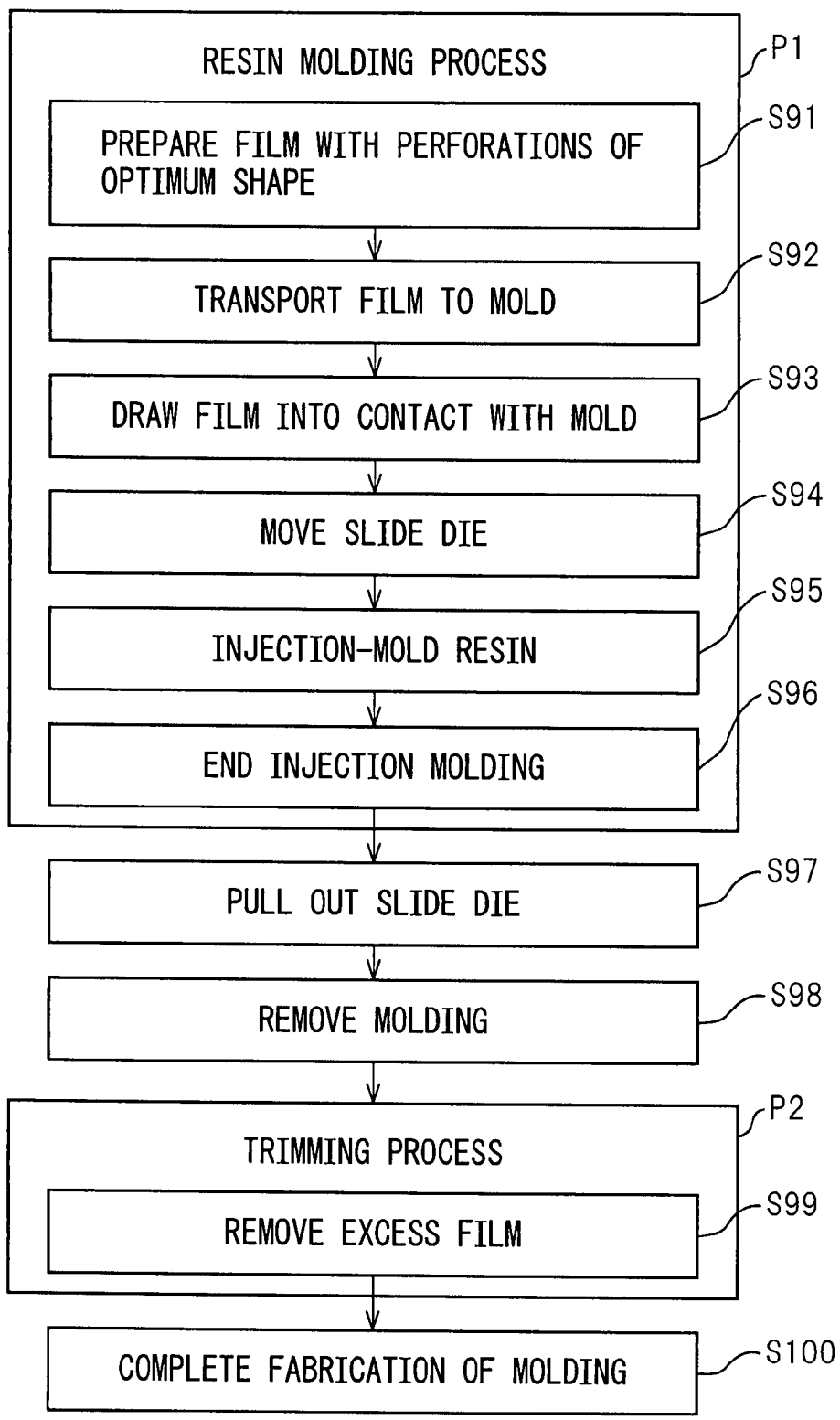
FIG. 22 is a flowchart explaining the sequence of processing steps in a fabrication method according to a specific example of a seventh embodiment.

The sequence of processing steps in one specific example of the thermoplastic resin casing fabrication method according to the seventh embodiment is shown in FIG. 22 in flow-chart form by taking as an example the thermoplastic resin casing having a mounting portion M3, as in the thermoplastic resin casing fabrication method according to the fifth embodiment. In the specific example of the fabrication method according to the seventh embodiment also, the mold 3 is used that is provided with the slide die 13 for forming a stepped mounting portion M3 on the casing B.

According to the flowchart shown in FIG. 22, in the resin molding process P1, first the polarizing film is drawn out of the roll, and the polarizing film 2 to be applied is prepared by forming perforations conforming to the optimum shape that matches the region where decoration is to be applied to the casing B (step S91). Next, the polarizing film 2 is transported and placed on the mold 3 having the recess of the prescribed shape (step S92). Then, the polarizing film 2 is thermoformed into the prescribed shape, and the recess is evacuated through the evacuation hole 4 thus drawing the polarizing film 2 into the recess of the mold (step S93). Up to this time, the forward end of the slide die 13 provided in the mold 3 is held flush with the interior surface of the recess of the mold 3.

Next, with the polarizing film 2 thus drawn into the recess of the mold 3, the slide die 13 is moved into the recess until its forward end protrudes by an amount equal to the depth of the step of the mounting portion M3 (step S94). Then, while retaining the shape of the polarizing film 2 with a portion thereof formed inwardly of the recess, the injection molding die 5 having a shape that matches the recessed shape of the mold 3 is placed onto the mold 3 by interposing the polarizing film 2 therebetween. Then, as shown in FIG. 16A, the thermoplastic resin is injected through the injection hole 6 provided in the injection molding die 5 (step S95). The injection molding thus ends, and the molding is cooled (step S96).

When the thermoplastic resin is cooled to the point where the molding can be retained in the prescribed shape in the recess of the mold 3, the slide die 13 provided in the mold 3 is moved back as shown in FIG. 16B by the same amount by which it was moved to project inward (step S97). Then, the molding is removed from the mold (step S98). A cross-sectional view of the edge portion of the thus removed molding is shown in FIG. 16C. In particular, as shown by a circle, the excess portion 26 of the polarizing film 2 extends beyond the end of the mounting portion of the casing B.

After the molding formed from the thermoplastic resin is removed from the mold 3, the process proceeds to the trimming process P2. Here, in the fifth embodiment, the laminated polarizing film 2 has been cut off by the cutter 14 placed at a suitable position on the side face of the mounting portion M3 of the casing B, as shown in FIG. 16C, but in the seventh embodiment, the excess portion 26 is separated from the polarizing film 2 along the perforations (step S99).

When the excess portion 26 is separated along the perforations, the fabrication of the molding is complete (step 100). Here, in the fifth embodiment, the polarizing film 2 terminates at the side face of the mounting portion M3 of the casing B, and the edge portion of the polarizing film 2 is made to adhere somewhere within the bounds of the mounting portion M3 of the casing B, as shown in FIG. 16D, but in the seventh embodiment, the edge portion of the polarizing film 2 is secured to the thermoplastic resin by being embedded therein along the perforations as indicated by a circle in FIG. 19C.

According to the specific example of the thermoplastic resin casing fabrication process of the seventh embodiment, the excess portion of the polarizing film 2 can be easily removed, and the fabrication process can be simplified accordingly. Furthermore, the edge portion of the polarizing film 2 is processed for fixing, preventing delamination of the polarizing film or formation of jagged edges.

The technique employed in the specific example of the fabrication method according to the seventh embodiment, i.e., the technique in which the polarizing film is formed with perforations providing the optimum shape for applying decoration to the casing B and is secured to the thermoplastic resin simultaneously with the injection molding thereof, can also be applied to such cases as when decoration is partially applied to the main surface of the casing B or when decoration need not be applied to the edge portion of the casing B.

The bending jig 10, pressing jig 11, slide dies 12 and 13, and the cutter 14 used in the fabrication methods according to the second, third, fifth, and seventh embodiments described above have each been shown only in cross section for convenience of illustration. When the polarizing film needs to be secured around the entire circumference of the casing B, each tool is arranged around the entire circumference. This can be accomplished by dividing each tool into a plurality of parts and mounting the respective parts in a movable manner. On the other hand, if the edge portion of the polarizing film needs to be fixed to the casing B only at a specified position, the tool should be placed at the corresponding position.

The thermoplastic resin casing fabrication method according to each of the above embodiments has been described by taking as an example the case in which the polarizing film as a member for providing a decorative effect to the casing is laminated to the surface of the casing during the injection molding of the thermoplastic resin, but it will be appreciated that the decorative member is not necessarily limited to the polarizing film, and the casing fabrication method according to each of the above embodiments can be applied to any kind of film as long as the film is a thin resin film having a decorative effect.

What is claimed is:

1. A thermoplastic resin casing comprising:
   a thermoplastic resin body injection-molded to form a protrusion with a prescribed shape containing a curved surface, and
   a film having a polarizing effect and being laminated to a surface of said thermoplastic resin body under heat and pressure when said thermoplastic resin body is injection molded, so as to conform with said prescribed shape, wherein
   an edge portion of said film is fixedly secured to said thermoplastic resin body by a portion of said film being embedded into said thermoplastic resin body when said thermoplastic resin body is injection-molded.

2. A thermoplastic resin casing as claimed in claim 1, wherein the edge portion of said film is fixedly secured to said thermoplastic resin body by fusing.

3. A thermoplastic resin casing as claimed in claim 1, wherein the film is an outermost layer of the thermoplastic resin casing.

4. A thermoplastic resin casing as claimed in claim 1, wherein the embedded portion of the film is abutted only by the thermoplastic resin body.

5. A thermoplastic resin casing as claimed in claim 1, wherein the film produces at least one decorative effect selected from the group consisting of an iridescent color effect, a smoothly changing iridescent color effect, a glittering luster effect, a holographic effect in which an image changes depending on the viewing angle, a holographic effect wherein shapes of an image change depending on a viewing angle, a holographic effect wherein colors of an image change depending on a viewing angle, a three-dimensional texture effect, and a decorative effect in which a texture of the film has depth.

6. A thermoplastic resin casing comprising:
   a thermoplastic resin body injection-molded to form a protrusion with a prescribed curved surface; and
   a film having a polarizing effect laminated on the curved surface of said thermoplastic resin body to form an outer surface of the casing that produces at least one decorative effect selected from the group consisting of an iridescent color effect, a smoothly changing iridescent color effect, a glittering luster effect, a holographic effect in which an image changes depending on the viewing angle, a holographic effect wherein shapes of an image change depending on a viewing angle, a holographic effect wherein colors of an image change depending on a viewing angle, a three-dimensional texture effect, and a decorative effect in which a texture of the film has depth, the film being laminated under heat and pressure when said thermoplastic resin body is injection molded, so as to conform with the prescribed curved surface, wherein
   a portion of the film is fixedly secured to said thermoplastic resin body by the portion being embedded into said thermoplastic resin body when said thermoplastic resin body is injection-molded.

7. A thermoplastic resin casing comprising:
   a thermoplastic resin body injection-molded to form a protrusion with a prescribed curved surface; and a film having a polarizing effect laminated on the curved surface of said thermoplastic resin body to form a decorative effect outer surface of the casing, the film being laminated under heat and pressure when said thermoplastic resin body is injection molded, so as to conform with the prescribed curved surface, wherein the film is fixedly secured to said thermoplastic resin body with a folded edge portion that is sandwiched by the thermoplastic resin body, the folded edge portion having first and second film pieces that are connected to one another at a fold in the film, the first and second film pieces being pressed in direct contact with one another by the thermoplastic resin during injection molding.

8. A thermoplastic resin casing as claimed in claim 7, wherein the edge portion of said film is fixedly secured to said thermoplastic resin body by fusing.

* * * * *